United States Patent [19]

Baugher et al.

[11] Patent Number: 5,937,791
[45] Date of Patent: *Aug. 17, 1999

[54] MOBILE CONTROLLABLE STROBE LIGHT SYSTEM AND METHOD FOR DIRECTING THE MOVEMENTS OF FISH

[75] Inventors: Susan Ann Baugher, Joelton; Ronald Earl Brown, Franklin; Dale A. Johnson, Bon Aqua; Roberto Schipp, Nashville; Mark Stevens Newsom, Hermitage; Tien Nguyen; Christopher Joel Shumate, both of Nashville; David Michael Terry, Murfreesboro, all of Tenn.

[73] Assignee: Flash Technology Corporation of America, Franklin, Tenn.

[ * ] Notice: This patent is subject to a terminal disclaimer.

[21] Appl. No.: 08/988,745

[22] Filed: Dec. 11, 1997

Related U.S. Application Data

[63] Continuation-in-part of application No. 08/766,192, Dec. 12, 1996, Pat. No. 5,850,806.
[51] Int. Cl.$^6$ .................................................. A01K 61/00
[52] U.S. Cl. ............................................ 119/219; 119/200
[58] Field of Search ..................................... 119/174, 200, 119/219, 201, 215, 216

[56] References Cited

U.S. PATENT DOCUMENTS

| | | | |
|---|---|---|---|
| 4,186,371 | 1/1980 | Toubkin et al. | 367/109 |
| 4,392,236 | 7/1983 | Sandstrom et al. | 378/45 |
| 4,626,992 | 12/1986 | Greaves et al. | 364/418 |
| 4,744,331 | 5/1988 | Whiffin | 119/3 |
| 4,876,565 | 10/1989 | Tusting | 354/403 |
| 4,888,905 | 12/1989 | Garr | 43/17.6 |

OTHER PUBLICATIONS

"Innovators with EPRI Technology", Jul. 1992.
"Cost Effective Approaches for Protecting Fish at Hydroelectric Projects", HCI Publications, 1992.
"Evaluation of Study Techniques to assess the Effectiveness the Strobe Light Deterrent System at Milliken Station on Cayuga Lake, Tompikins Country, New York".
"A Demonstration of Strobe Lights to Repel Fish", Waterpower '91.
"Species of Fish Showing Avoidance Response to Strobe Lights", EPRI TR–104122, project 2694–10, Final Report, May 1994.
"Shad Project at York Haven Shows Results", Met–Ed News, Release date: Oct. 22, 1991.
"Guiding American Shad with Strobe Lights", Hydro Review, Jul. 1992.
"Response of Juvenile Coho and Chinook Salmon to Strobe and Mercury Vapor Lights", North American Journal of Fisheries Management, 1992.
"Behavioral Barriers".

*Primary Examiner*—Thomas Price
*Attorney, Agent, or Firm*—Waddey & Patterson; Mark J. Patterson

[57] ABSTRACT

A mobile system for directing fish away from danger points at an underwater structure includes multiple submersible flash heads operatively connected to a power and control center installed inside a trailer. The flash sequence, rate and intensity are adjustable by the system operator in real time using a system control unit which can be remotely controlled. The flash heads, connected in a tri-pack configuration, are strobed in a manner intended to alter the behavior of the fish. The system may include means to generate an air curtain near the flash heads to improve light dispersion and water jet means to clean the lenses on the flash heads.

33 Claims, 29 Drawing Sheets

| FIG. 4a1 | FIG. 4a2 |
| --- | --- |
| FIG. 4a3 | |

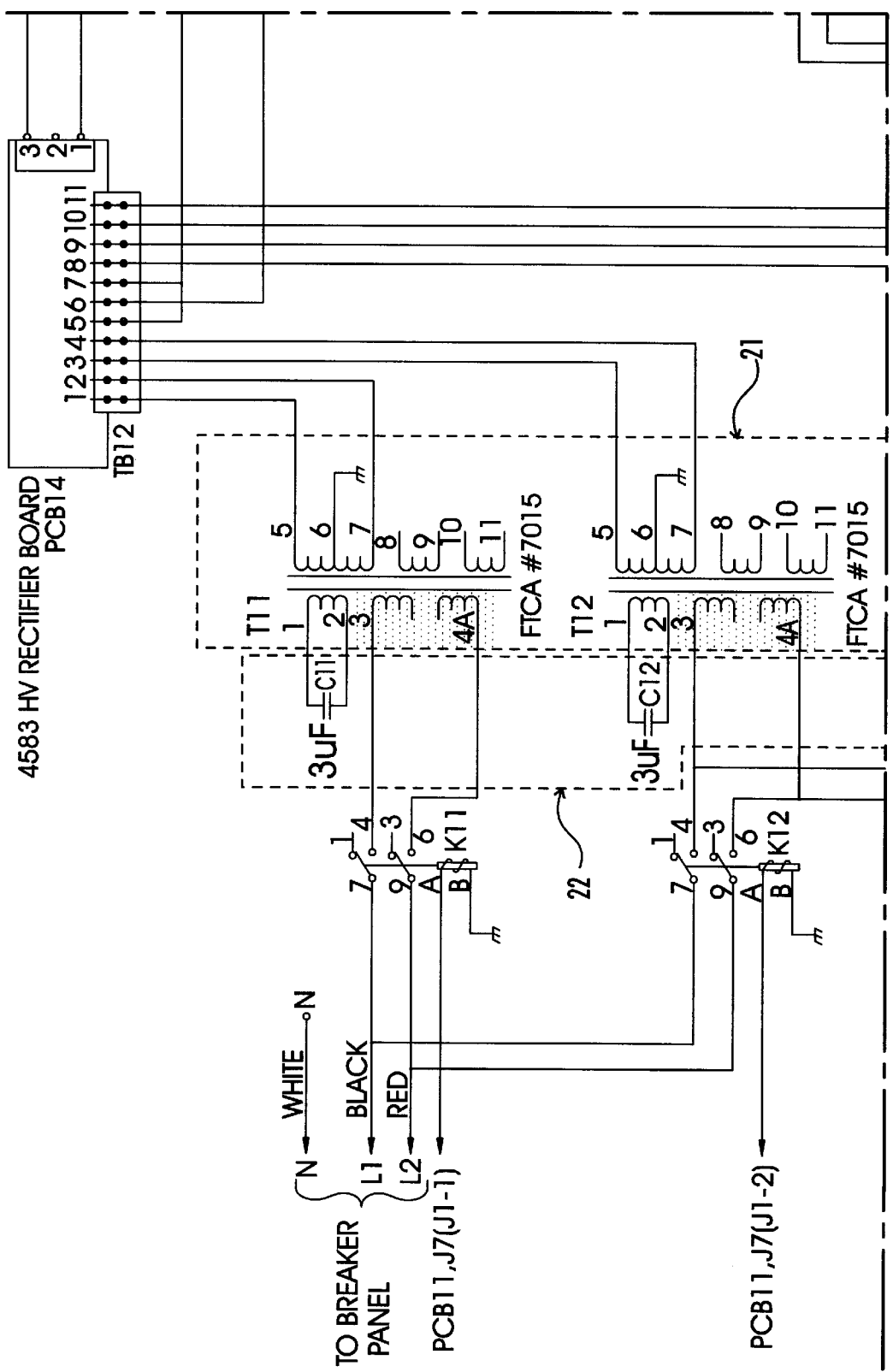
FIG. 4a1

OFF-BOARD TEMPERATURE SENSORS
PCB12,J1-6 ⟷ PCB11,J14(J1-6)
PCB12,J3-3 ⟷ PCB11,J14(J2-6)
PCB12,J3-4 ⟷ PCB11,J15(J1-6)
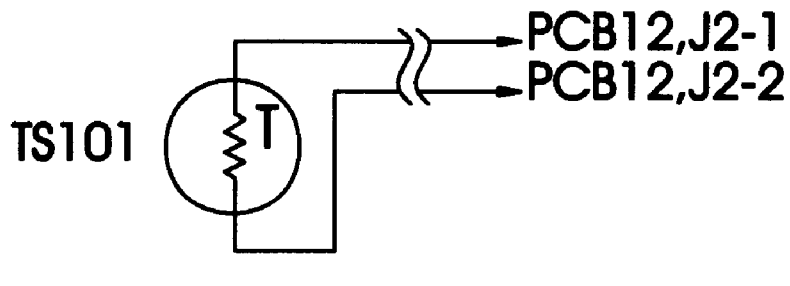
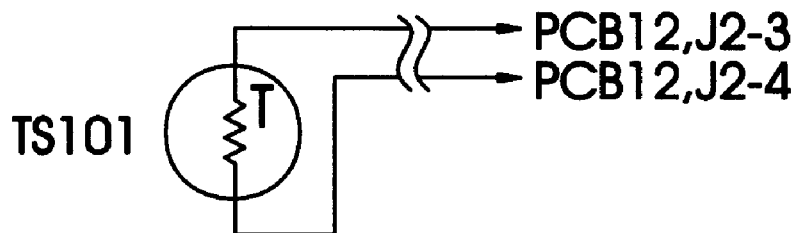
KEYSTONE #RL2007-1723-103-SA
*FIG. 4b*

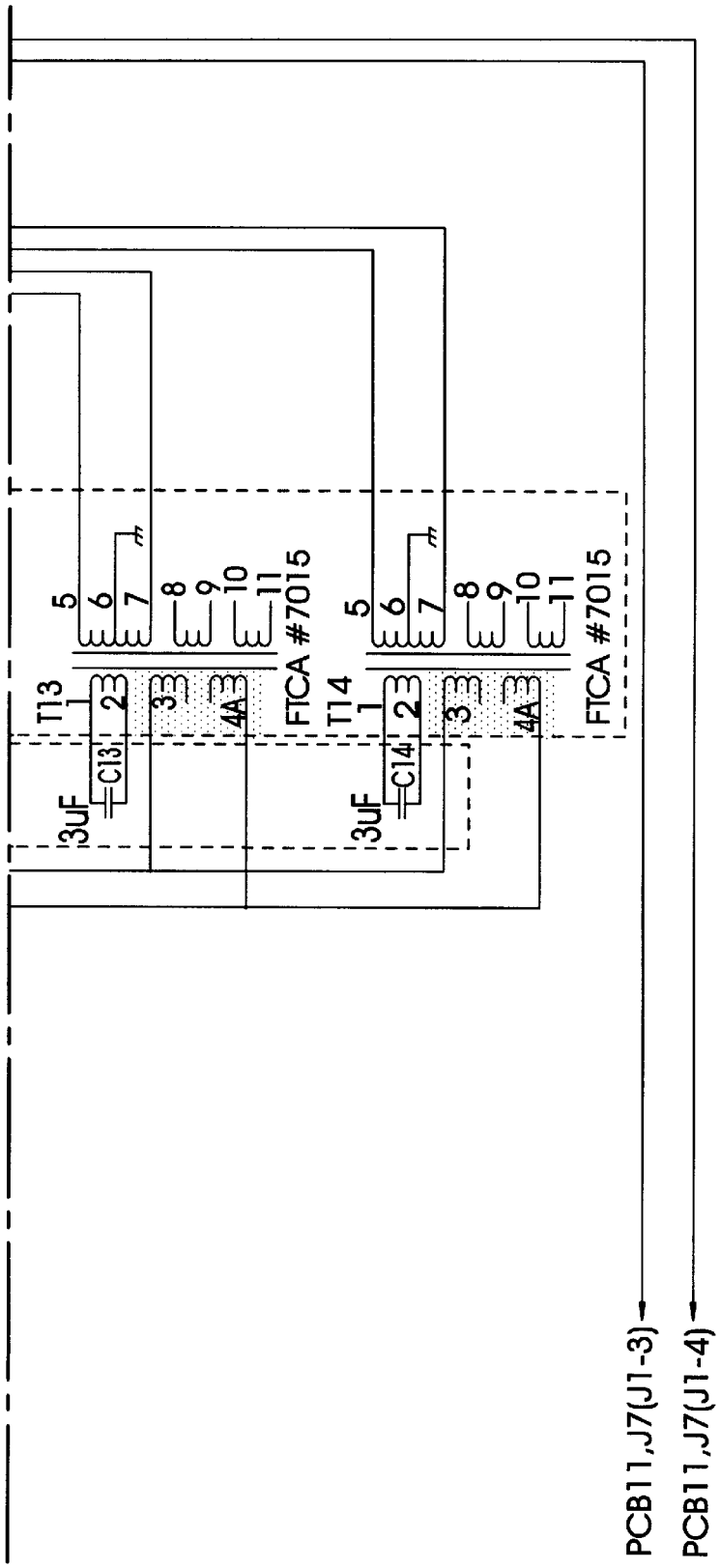
FIG. 4a3

OFF-BOARD TEMPERATURE SENSORS
PCB12,J1-6 ⟷ PCB11,J14(J1-6)
PCB12,J3-3 ⟷ PCB11,J14(J2-6)
PCB12,J3-4 ⟷ PCB11,J15(J1-6)
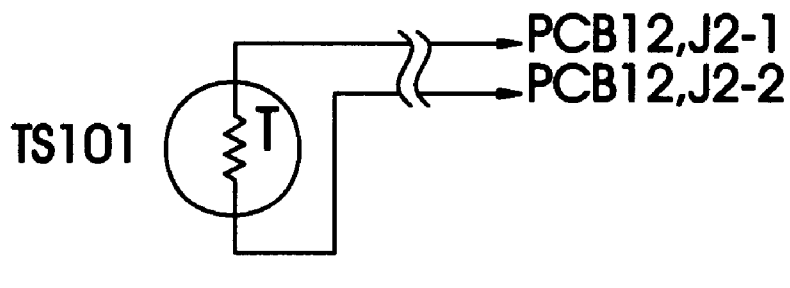
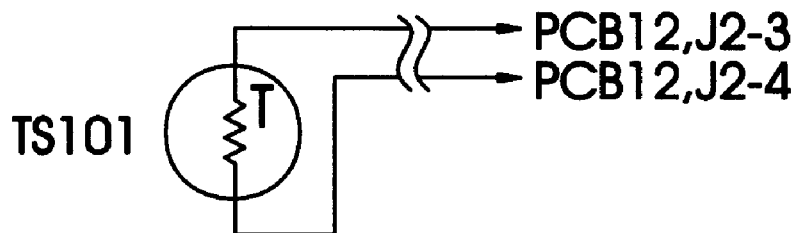
KEYSTONE #RL2007-1723-103-SA
*FIG. 4b*

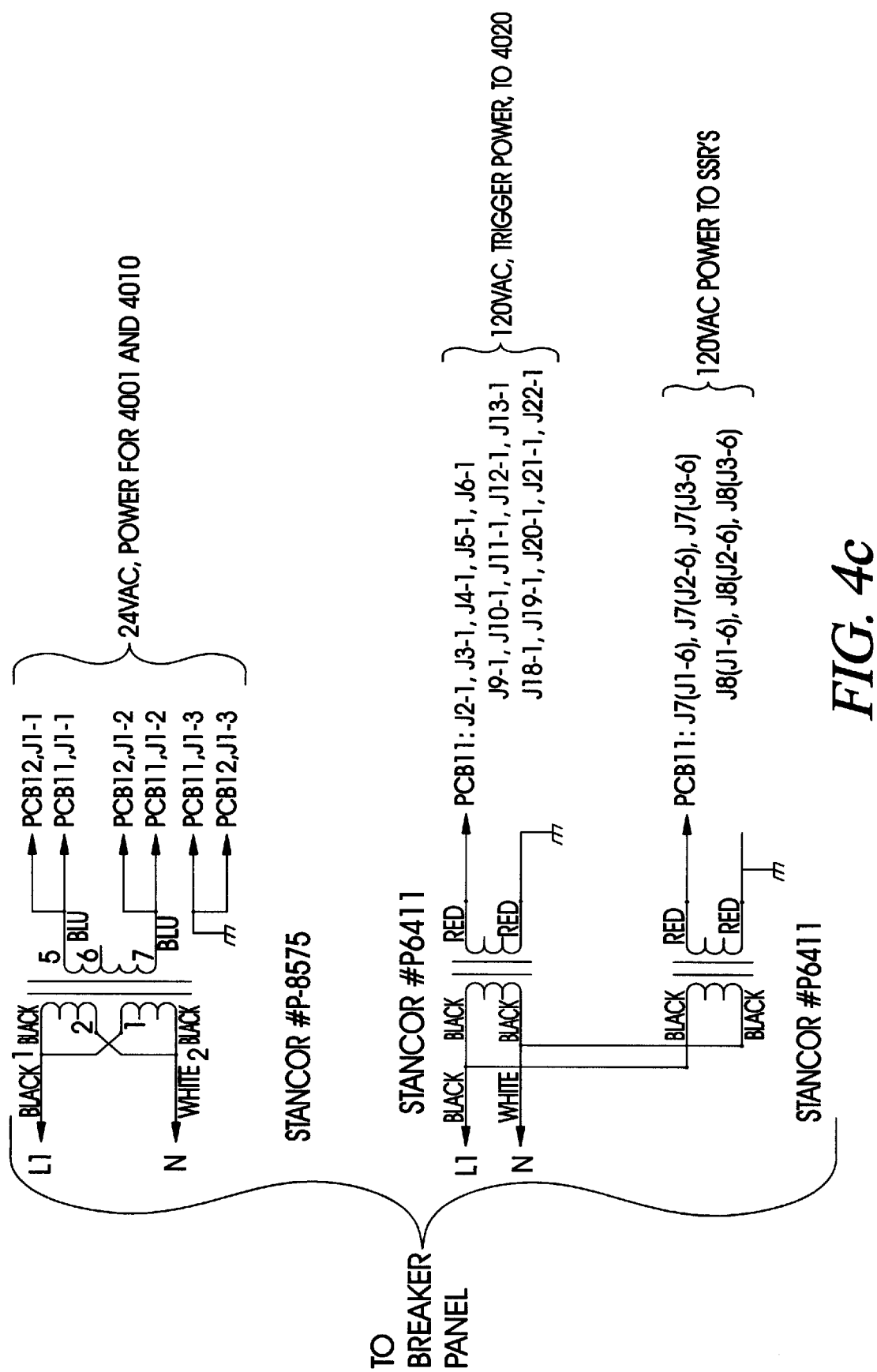

MOBILE CONTROLLABLE STROBE LIGHT SYSTEM AND METHOD FOR DIRECTING THE MOVEMENTS OF FISH

This application is a continuation-in-part application of U.S. patent application Ser. No. 08/766,192 filed on Dec. 12, 1996, now U.S. Pat. No. 5,850,806, entitled "Controllable Strobe Light System and Method for Directing the Movements of Fish."

Be it known that we, Susan Ann Baugher, a citizen of the United States, residing at 7131 Bidwell Road, Joelton, Tenn.; 37080, Ronald Earl Brown, a citizen of the United States, 2207 Bowman Road, Franklin, Tenn., 37064, Dale A. Johnson, a citizen of the United States, residing at 10431 Bekka Belle Circle, Bon Aqua, Tenn., 37025; Mark Stevens Newsom, a citizen of the United States, residing 4235 Sweden Avenue, Hermitage, Tenn., 37076; Roberto Schipp, a citizen of the Germany, residing at 4508 Price Circle, Nashville, Tenn. 37205; Tien Nguyen, a citizen of the United States, residing at 6418 Thunderbird Drive, Nashville, Tenn., 37209; Christopher Joel Shumate, a citizen of the United States, residing at 221 Riverstone Court, Nashville, Tenn. 37214; David Michael Terry, a citizen of the United States, residing at 3002 Roellen Drive, Murfreesboro, Tenn., 37130; have invented a new and useful "Mobile Controllable Strobe Light System and Method for Directing the Movements of Fish."

BACKGROUND OF THE INVENTION

The present invention relates generally to barriers and other devices used to repel or direct the movement of migrating fish away from turbine intakes and other danger points at dams, hydroelectric facilities, and water intakes in lakes and rivers. More particularly, the present invention describes a system for directing the movement of fish in which the system uses multiple underwater strobe lights strategically positioned and controlled to direct fish away from and towards desired locations.

Hydroelectric power plants and dams have been used throughout the United States and the world with great effectiveness in electric power generation, irrigation, and flood control schemes. However, the increasing use of obstructions across rivers and other navigable waterways has created problems of its own, including deleterious effects on fish populations. For example, hydroelectric dam turbine intakes are a natural attraction point for schooling and migrating fish. If fish are allowed to enter those intakes, large numbers of fish are killed in relative short periods of time. Such fish kills, in turn, can cause damage to the facilities themselves. Also, dams and other structures placed across rivers can interfere with the natural migratory patterns of fish that have been established over the years. If these fish are not allowed to pass the dam and are obstructed from following their natural migratory waterways, fish populations can be greatly impaired. Similar problems can occur at municipal and industrial water intake sites, where large numbers of fish can be drawn into the intake. Therefore, it is important that some means be provided to direct migrating fish around or through a dam, obstruction, or intake so that they can reach their natural spawning grounds.

In response to these issues, federal and state agencies have become increasingly active in establishing a regulatory scheme for the protection of fish in these environments. Accordingly, a variety of physical barrier technologies have been developed in the prior art. These prior art technologies include the use of barrier nets, fish lifts, racks, mesh screens, and louvered bypasses. Unfortunately, such physical barriers have not been optimally efficient in protecting or diverting fish. Moreover, the installation of physical barriers can be extremely expensive, in that custom barrier designs must be developed for each location. Ongoing maintenance costs are also a significant negative factor in the use of physical barriers to control fish.

As an alternative to the use of physical fish barriers, experiments have been conducted in the prior art in the use of strobe lighting as a means to repel fish or otherwise control or direct their movement as they confront or approach a dam or other water intake. These experimental studies have demonstrated that strobe lights produce strong avoidance behavior in a variety of fish species on a consistent basis. In addition, the fish who show this avoidance behavior do not show a tendency to become acclimated to strobe light stimuli, even after prolonged exposure.

The strobe light systems used in the prior art experiments for the control of fish behavior have been deficient in a number of respects, particularly in regards to the development of a commercially useful system which can be easily adapted, installed, and used in a wide variety of physical and aquatic environments and that can be used, without significant modification, to control the behavior of one or more of multiple fish varieties. Thus, for example, variations in ambient water turbidity, water flow rate, flow direction, and water temperature, can directly impact the efficiency of fish control using strobe light systems. In addition, experimentation relating to the development of the present invention has shown that adjustment of flash intensity, flash frequency, and flash sequence is necessary in order to optimally adapt a strobe light fish control system to a particular environment and to a particular species of fish. Prior art systems have not allowed this degree of flexibility and control leading, to the conclusion that such systems can only be considered to be experimental rather than commercially useful.

For behavioral control of fish during a short migration season, there is only a very narrow window of opportunity to adapt a strobe light control system to that species of fish and to the particular environmental conditions encountered. Therefore, real time reaction and control of the system to varying ambient conditions and fish behavior is an important factor. Such control is not found in any of the prior art experimental systems. Furthermore, a short migration season also requires that a system be mobile to be positioned quickly and efficiently by a dam or other intake so as to provide a deterrence for the fish and then be able to move on to another site.

Another problem found with prior art strobe light fish control systems relate to the longevity of the crucial underwater portion of the system, that being the multiple strobe light flash heads. Much of the prior experimentation with such systems has been used in conjunction with flash heads mounted at or near the water surface, attached to floating structures. However, a universally adaptable, commercially useable fish control system using multiple strobe flash heads must be capable of installation at significant depths below the water line, up to perhaps one hundred-fifty feet. This produces a set of problems of its own, particularly in heat management. The preferred means of generating illumination from a strobe flash head is the xenon tube which is both durable and highly efficient. However, the heat generated by the xenon tube and related components must be carefully controlled, particularly in an underwater location, so that the flash head will not fail prematurely because of excessive heat buildup. Experimental prior art strobe light fish control systems have relied on relatively crude adaptations of strobe light devices which have not fully met the needs for deep water submersion, durability, and high flash intensity.

What is needed, then, is a system for the control of fish movement using strobe lights which can be easily installed and adapted to a wide variety of physical environments, can be controlled and adjusted to influence the behavior of a wide variety of fish species, and which carefully deals with flash head heat management in order to prolong the durability of the system.

SUMMARY OF THE INVENTION

One object of the present invention is to provide a system to direct the movement of fish near man-made structures that is reliable, efficient, flexible, easy to install, mobile, and easy to maintain.

Another object of the present invention is to provide a strobe light fish movement control system in which operational control and finctioning of the system can be adjusted easily and in real time to adapt the system to changing water and other conditions near the structure.

Yet another object of the system of the present invention is to provide flash heads in a multiple flash head strobe light fish movement control system which can operate efficiently and continuously while submerged.

A further object of the present invention is to provide a controllable strobe light system that is easily transportable to locations where control of fish movements may be needed.

These and other objects of the invention which will be apparent to those skilled in the art are met by a strobe light fish movement control system in which multiple flash heads are linked to a system control unit through a flash head interface and control unit. The personal computerbased system control unit includes data communication services, status monitoring devices, and control links which allow an operator of the system to change and monitor the flash sequence, flash rate, and flash intensity. In addition, an air bubble curtain and water jets installed at or near the flash heads allow the system to adapt to changing water conditions and fish varieties so that the system can be easily optimized for a particular environment.

The flash heads used in the system are configured for long life while submerged through the use of novel heat management features. A squirrel cage cooling fan is used with a temperature sensor that sends signals to the system so that appropriate heat control measures can be undertaken. Air is removed from each flash head and replaced with nitrogen, which reduces the corrosive effect of ozone within the flash head housing. A nitrogen plenum is formed around the flash tube inside the waterproof flash head housing so that the nitrogen can be easily circulated, with a nitrogen passageway formed between the outside of the nitrogen plenum and the inner wall of the housing. A parabolic reflector enhances radiated light from the flash head and forms a top surface of the nitrogen plenum. Forced nitrogen is brought to the flash tube through an opening in the central portion of the parabolic reflector, thereby minimizing light loss.

Constant monitoring of flash rate, flash intensity, and flash head temperature prevents overheating of the flash tube in each flash head.

All components of the system are configured to be transported in a mobile trailer. The trailer is divided into multiple areas to house the various electronic and power subsystems. The electronics, including portions of the flash head interface and control circuit are installed in an active back plane configuration in one area of the trailer using motherboards and daughter cards. The system control unit is located in another area of the trailer so that the system can be operated inside the trailer. Another area of the trailer houses various power components and connections, including flash head termination racks for connections to the flash heads and transformer and capacitor racks.

Temperature control of the trailer is maintained by using one or more internal and external temperature sensors and cooling devices.

BRIEF DESCRIPTION OF THE DRAWINGS

FIG. 4$b$ is a schematic diagram of a portion of the flash head interface circuit showing the connections to two of the off-board temperature sensors.

FIG. 4$c$ is a schematic diagram a portion of the flash head interface circuit showing the low and high voltage power connections for the motherboards, temperature sensing boards, trigger power, and relay power.

FIG. 4$d$ is a schematic diagram a portion of the power and control center used to provide power to the power and control center cooling fan motor.

FIG. 5 is an illustration of a typical video display screen presented to a system operator at the system control unit to display the status of a flash head.

FIG. 10$b$ is a side view of a flash head housing.

FIG. 10$c$ is a plan view of a flash head housing.

FIG. 11$b$ is a cut-away side view of a single flash head.

DESCRIPTION OF THE PREFERRED EMBODIMENT

SYSTEM OVERVIEW

Figure 1:
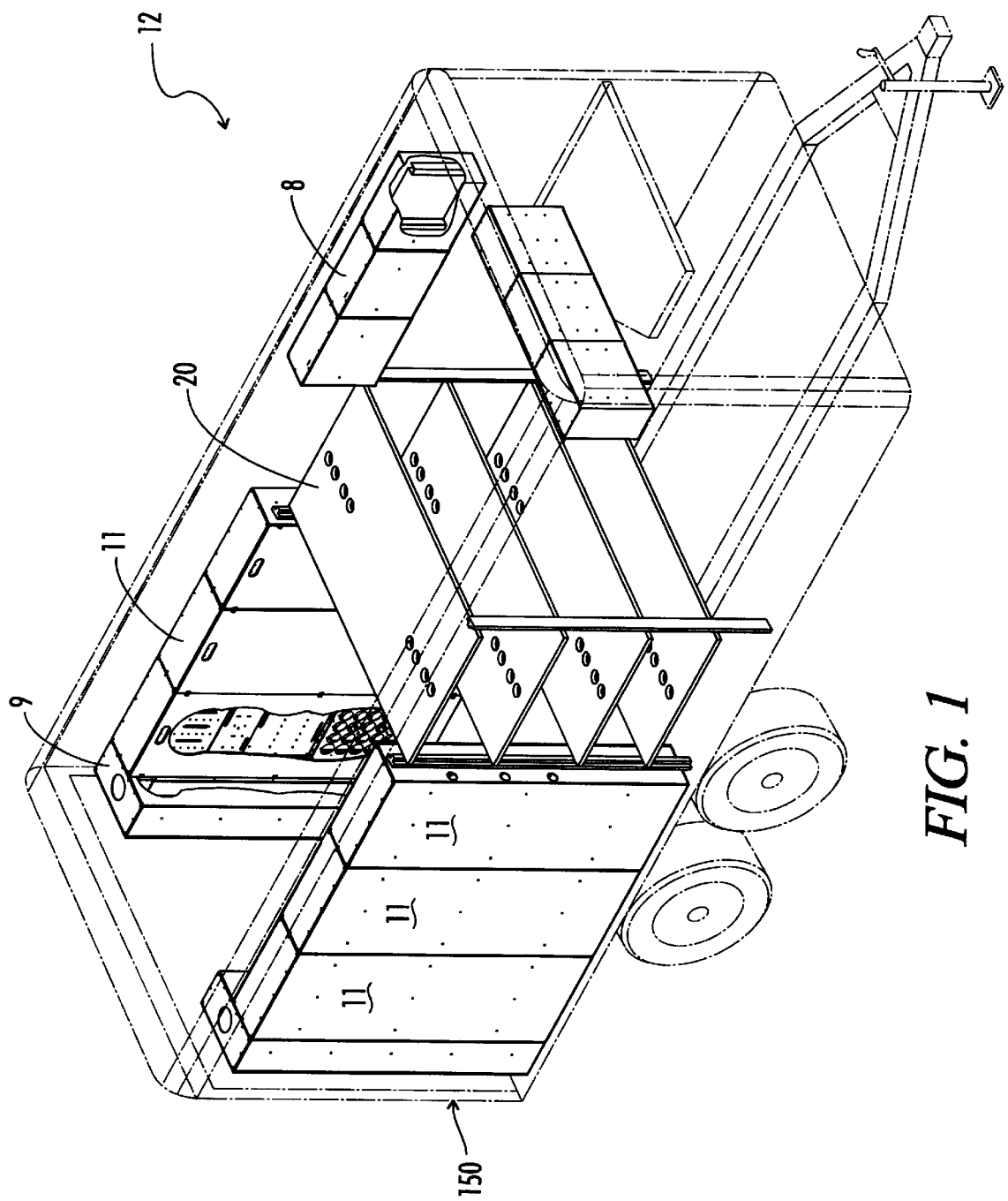
FIG. 1 is a perspective view of the general mechanical arrangement of the power and control center of the present invention positioned in a mobile trailer, including the flash head termination racks, the capacitor racks, a transformer assembly rack, and the motherboard enclosures (shown in phantom with no components connected).
Figure 26:
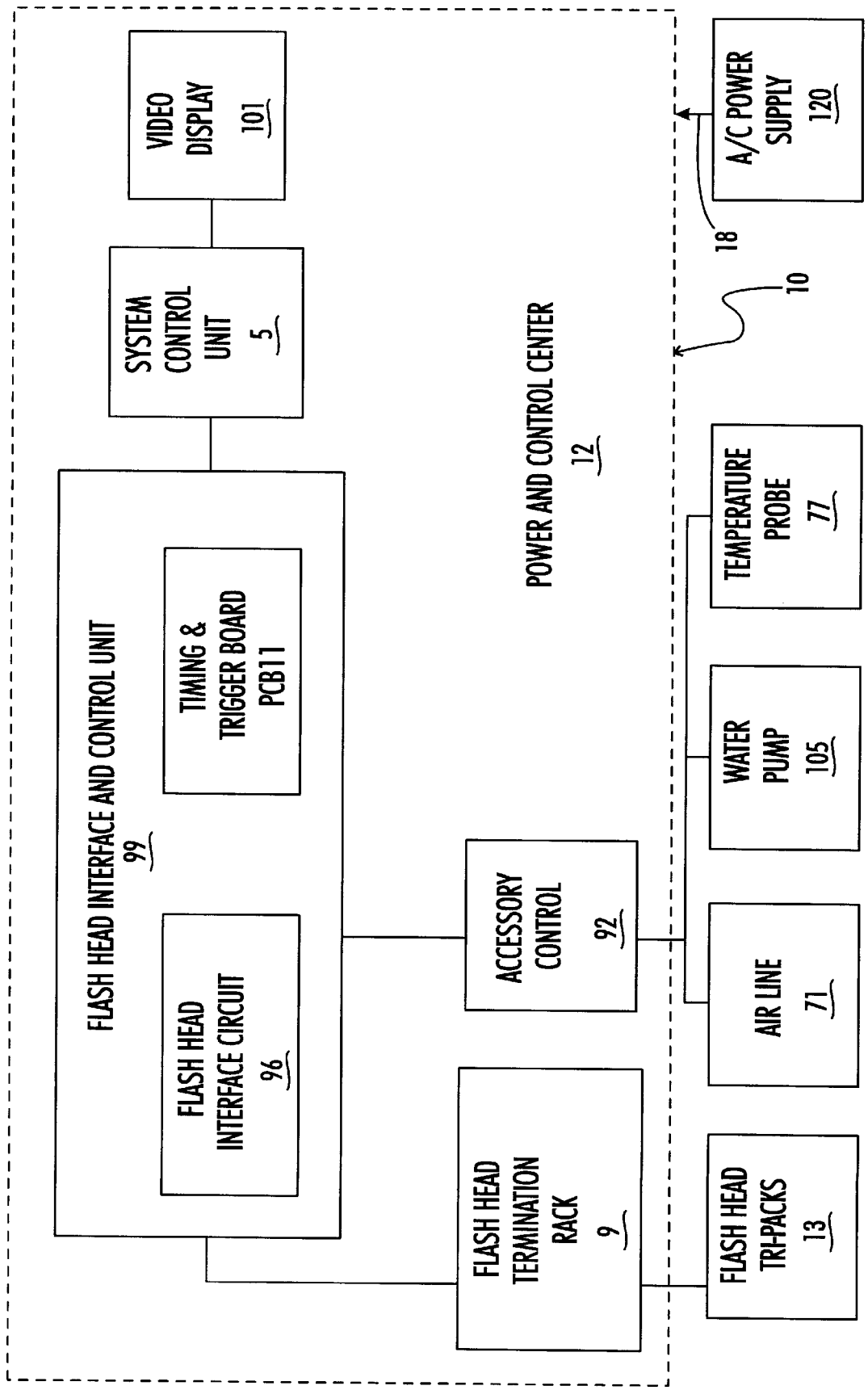
FIG. 26 is a block diagram showing the interconnection of the various functional units of the system of the present invention.

The fish movement control system 10 is designed to provide an improved solution to the problem of entrainment of aquatic life in hydroelectric power plant intakes, pump-back station intakes, spillway intakes, and the like. A general functional arrangement of the system 10 is shown in FIG. 27. A set of multiple flash heads 13 configured in groups of three (called tri-packs) is operated in a pre-determined sequence to provide the strobed illumination used to direct movements of fish when the flash heads 13 are installed underwater near a structure. Each tri-pack of flash heads 13 is connected by a single power and control cable 17 to a mobile power and control center 12 ("the control center") that includes a system control unit 5 that determines the rate and intensity that the flash heads 13 are illuminated. The mobile control center 12, shown in the block diagram of FIG. 26, generally and in FIG. 1, includes a system control unit 5, a flash head interface and control unit 99, and a flash head termination rack 9 for connections to the tri-packs of flash heads 13.

Figure 2:
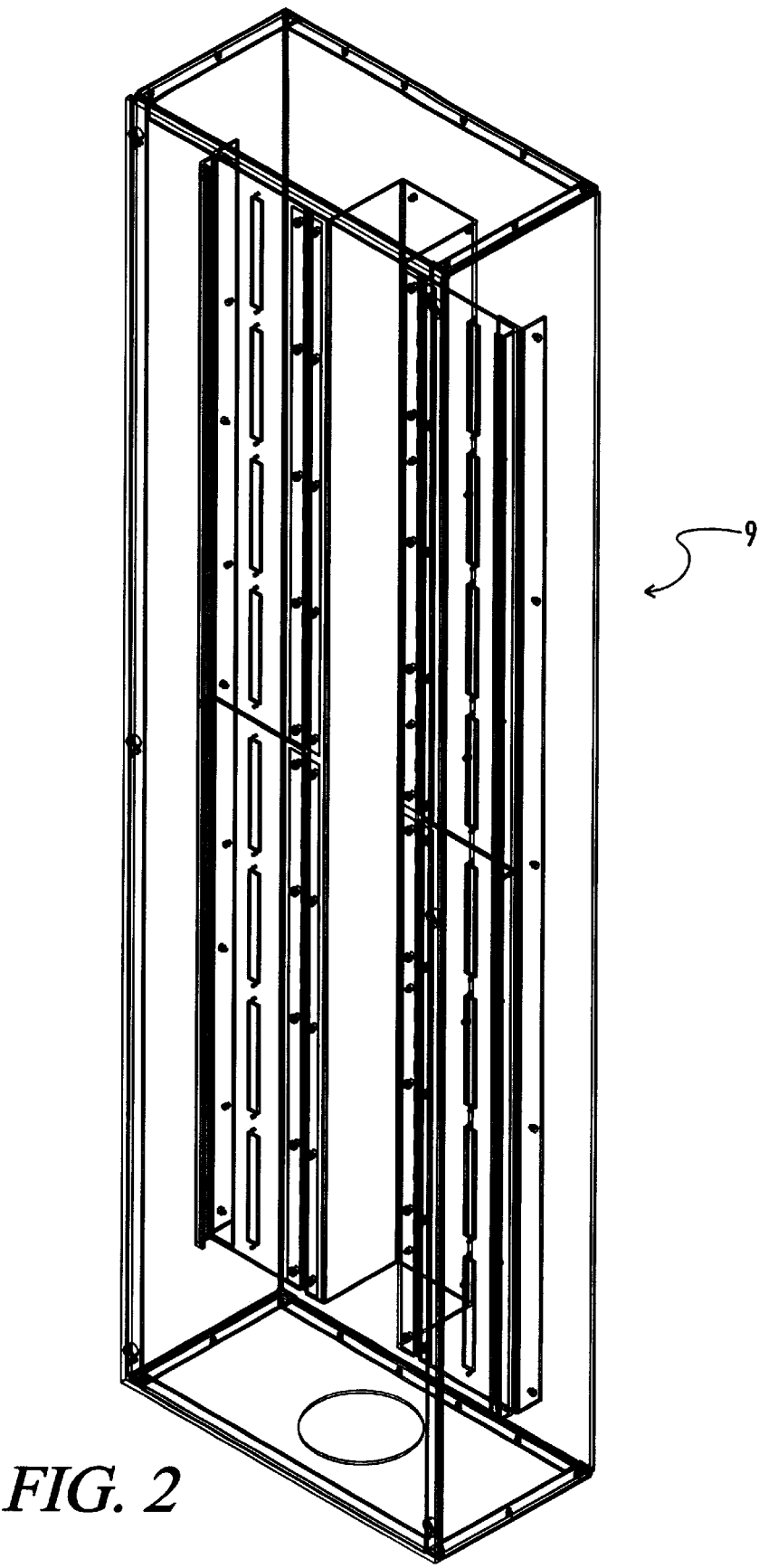
FIG. 2 is an enlarged perspective view of a flash head termination rack (the connections to the flash heads not shown) as used in the system of FIG. 1.

Mechanically, the control center 12 is housed in a trailer 150, which allows for mobile installation of the system 10 near the structure where fish control is desired. Inside the trailer 150, the control center 12 is physically divided into different areas: an area housing the system control unit 5, a series of motherboard racks 8 which accommodate the flash head interface and control units 99, and an area for mounting the transformer racks 20, capacitor racks 11 (FIG. 3), and flash head termination racks 9 (FIG. 2).

The system control unit 5 includes a personal computer (not shown), operatively combined with command interface, preferably a keyboard, a mouse, and a modem, to allow the operator of system 10 to enter system commands that operatively control and receives data from the flash heads 13.

The system control unit 5 is connected to a plurality of flash head interface and control units 99 that are partially mounted on motherboards and daughter cards in a conventional active back plane arrangement. Each flash head interface and control unit 99 includes a flash head interface circuit 96 and a timing and trigger board PCB11 with electrical subsystems (see FIG. 23). The timing and trigger board PCB11 includes a microprocessor 80, with random access memory 83 for computation of observed values, power supply 93 and interface circuitry 95 for communicating with a set of flash heads 13 described below. Each motherboard has twenty-one expansion slots that allow for the addition of daughter cards on which portions of the flash head interface and control unit are installed. Fifteen of the expansion slots are dedicated to controlling fifteen flash heads 13. The additional six expansion slots are separated as follows: two are general purpose inputs, two are general purpose outputs, and two are dedicated to configuring communication with the personal computer of the system control unit 5.

Figure 23:
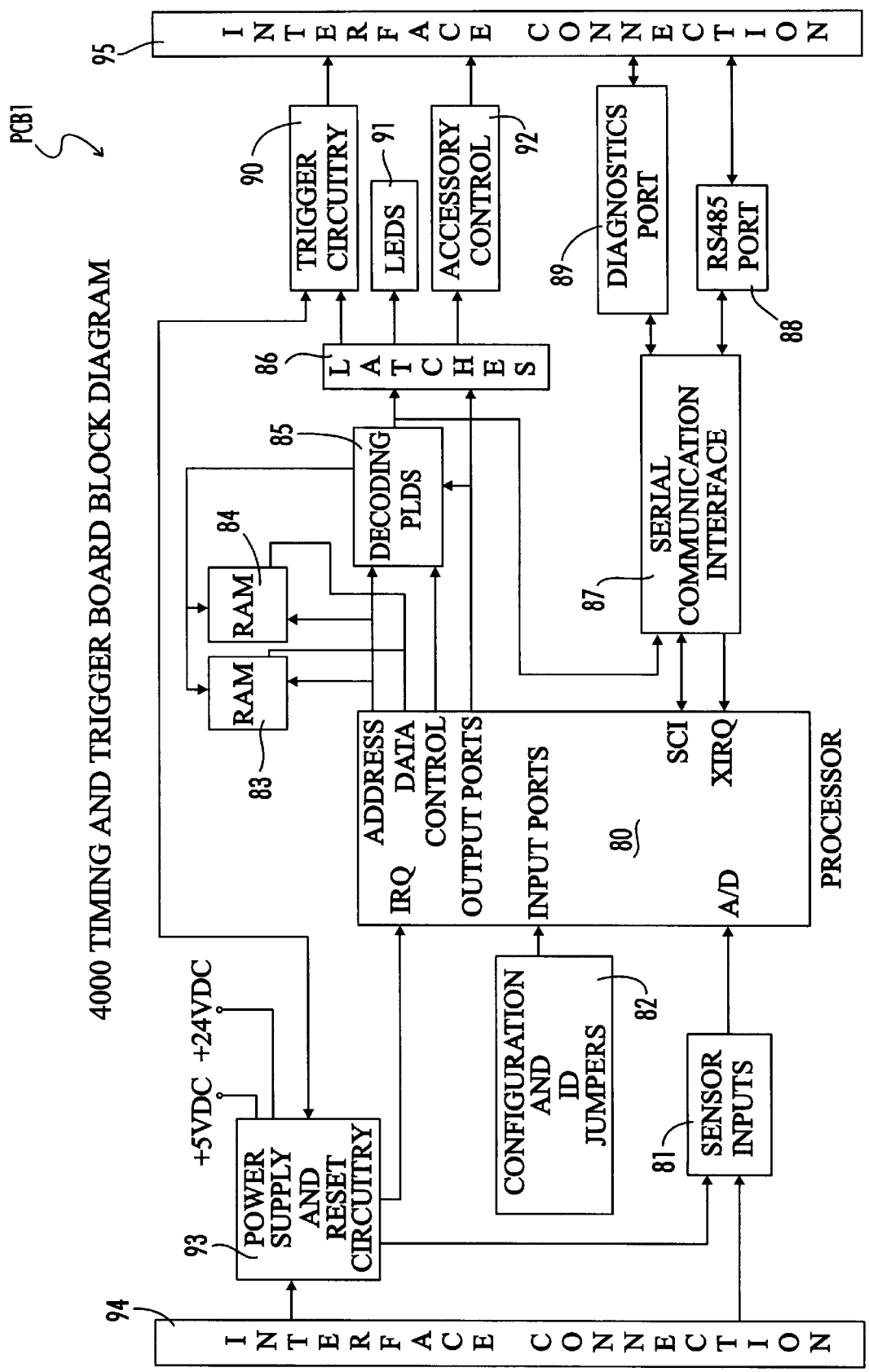
FIG. 23 is a block diagram of the internal electrical subsystems of the timing and trigger board.
Figure 24:
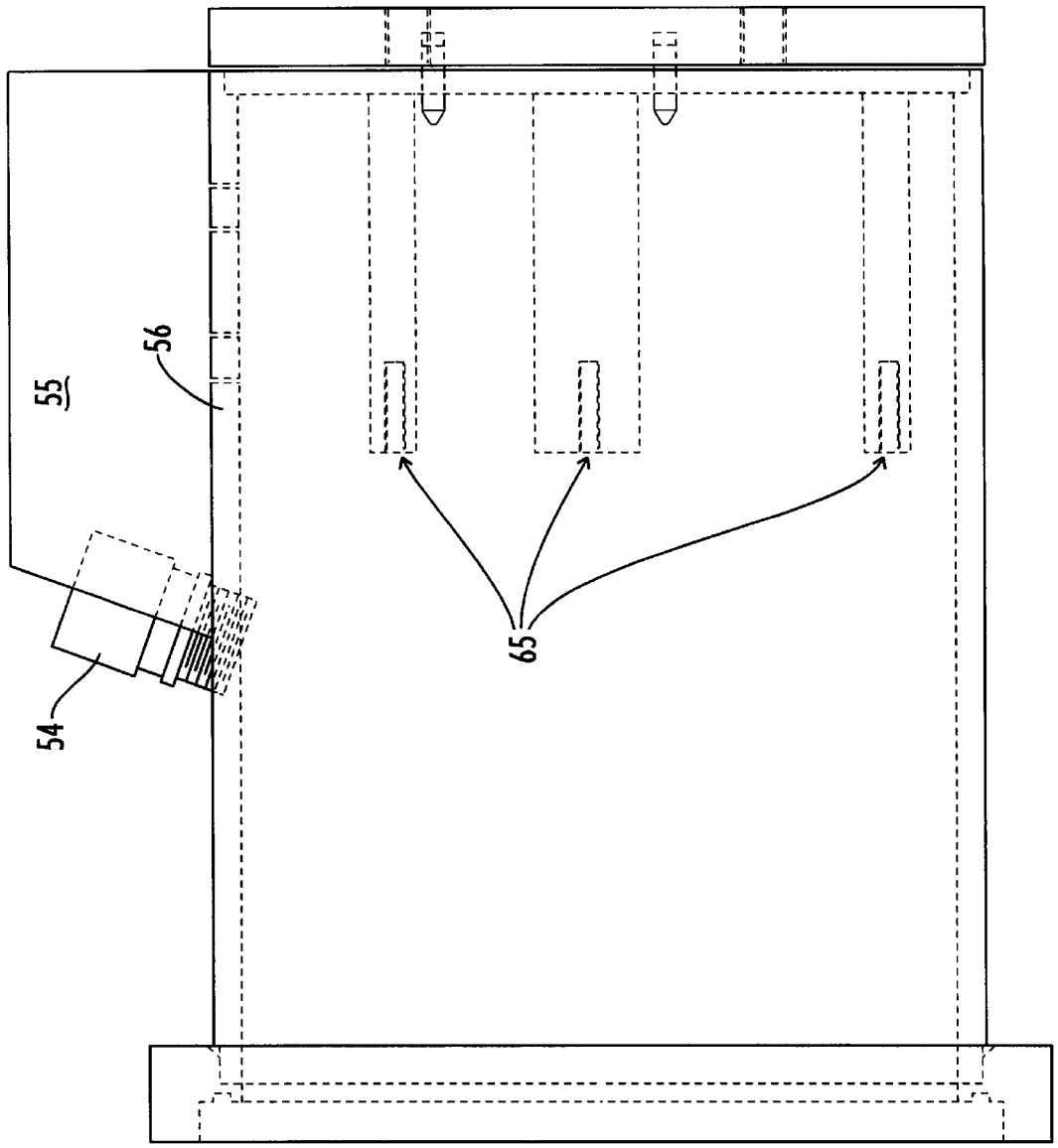
FIG. 24 is a cutaway side view of the flash head housing also showing the interior mounting posts.

Overall control functions for system 10 are performed in the system control unit 5 of the control center 12. The system operator can monitor the operation of the system 10 by viewing a video display 101 with information that is displayed when the software is executed by the personal computer. Data communications between the system control unit 5 and each flash head interface circuit 96 are implemented by a serial data communications interface 87 (FIG. 23).

Figures 3, 4A:
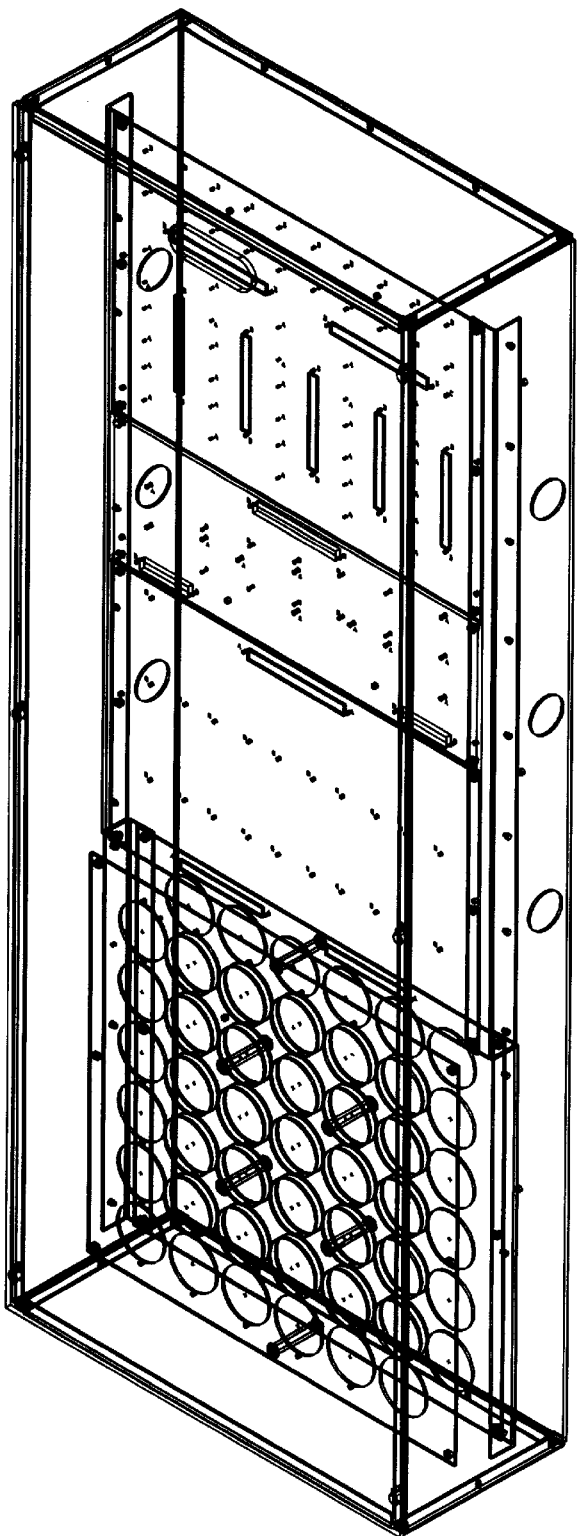
FIG. 3 is an enlarged perspective view of a capacitor rack as used in the system of FIG. 1 (no installed capacitors shown).
Figure 4D:
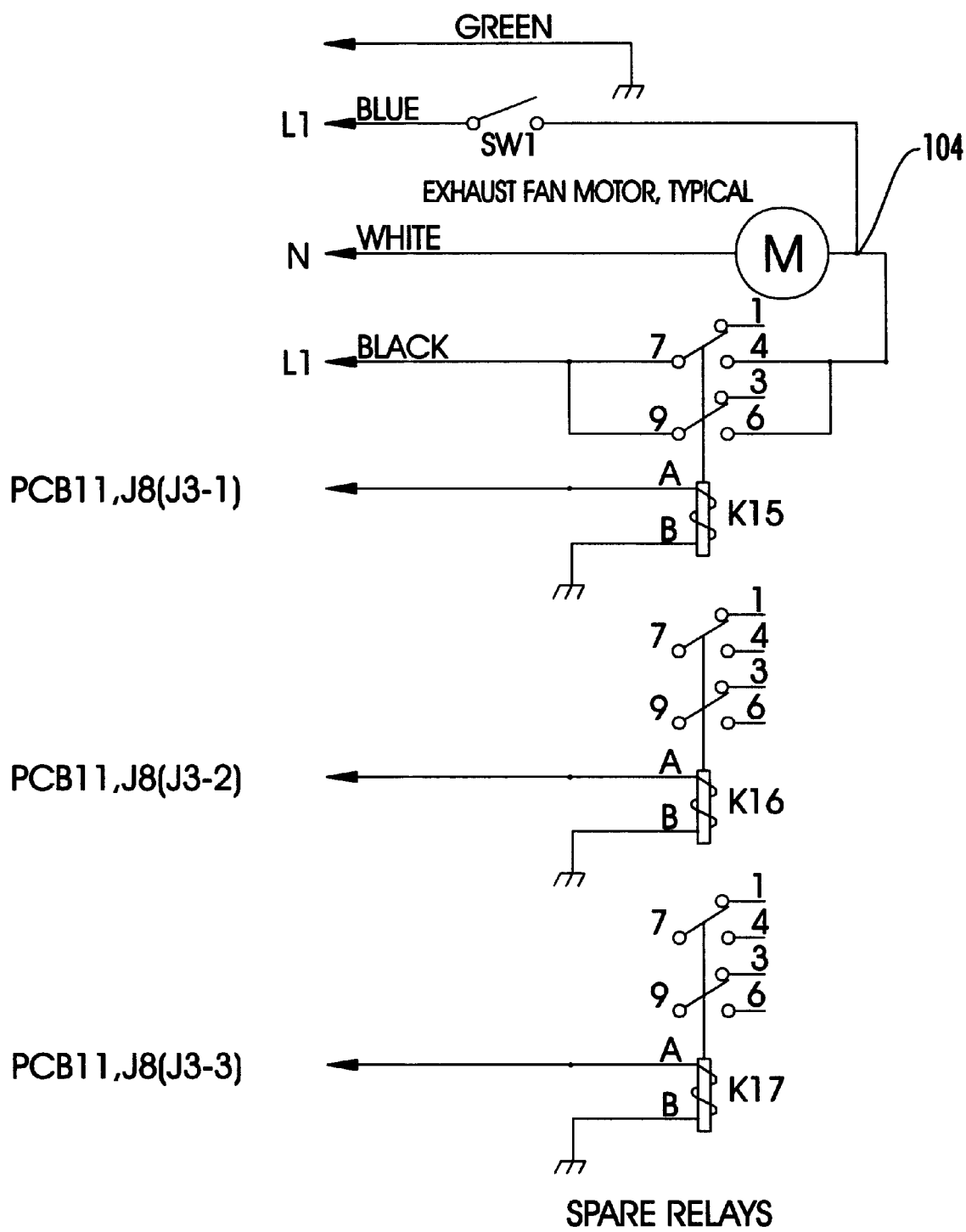
FIG. 4$a$ is a schematic diagram of a portion the flash head interface circuit used, showing the power and flash tube trigger connections to the tri-packs of flash heads as well as to the capacitor and transformer banks.

Preferably, the area that houses the system control unit 5 in the trailer 150 is further cooled by a roof mounted cooling fan 104 (shown in FIG. 4d). The temperature inside and outside the trailer 150 is measured via temperature sensors located internal and external to the trailer 150 (two of which are shown schematically as TS101 on FIG. 4b).

In some aquatic environments, it may be desired to provide illumination wavelengths at each flash head 13 which are selectable by the system operator after the flash heads 13 are installed. In those situations, a flash head 13 may have two or more illumination devices and associated trigger circuits 93, with the system control 5 allowing the system operator to switch between illumination devices and circuits to vary the flash wavelength. The respective illumination devices (xenon helical flash tubes 60 on FIG. 11b) will have different color filters associated with them so that flash wavelength is selectable.

Electrical power is provided to the system 10 from a conventional power interface panel (not shown) having a power input cable 18 connected to a conventional A/C power supply 120 that is either provided at the location of the structure or is a conventional A/C power supply generator that travels with the system 10, with operational power then being delivered to the control center 12 by power output cables 18.

In the preferred embodiment, power transformer bank 21 (FIG. 4a) includes three transformers T12, T13, and T14 connected in parallel that serve as the primary power source for the system 10. In a second embodiment, power transformer bank 21 can instead comprise one single transformer capable of providing power for the system 10. An auxiliary power transformer T11 is also included to serve as auxiliary power source for the system 10. The auxiliary watt transformer is switched in and out of the flash head interface circuit 96 to increase or decrease the power output to the capacitor bank 23 as required by the system 10. The connections for providing power to the motherboards and daughter cards of the system are shown in FIG. 4c.

The system 10 also includes, in a preferred embodiment, a conventional air compressor (not shown) which has an "on/off" control input, connected to an output relay (not shown) in the control center 12 with an air line 71 (FIG. 25) extending into the water around the system 10. This gives system 10 the capability of generating an underwater air bubble curtain near one or more flash heads 13 as installed. The air bubbles 72 enhance light dispersion and reflection, making the strobed lights more visible to the fish.

A conventional water pump 105 (see FIG. 26) can also be used in conjunction with system 10, the purpose of which is to supply high pressure water to a water jet 74 (FIG. 25) directed at the lens area of each flash head 13. The water jets can be used to remove scum that may build up on the surface of lens 57. Furthermore, the lens 57 of each flash head 13 is preferably coated with an antifungal treatment to prevent the blocking of light output by fingal growth.

Figure 25:
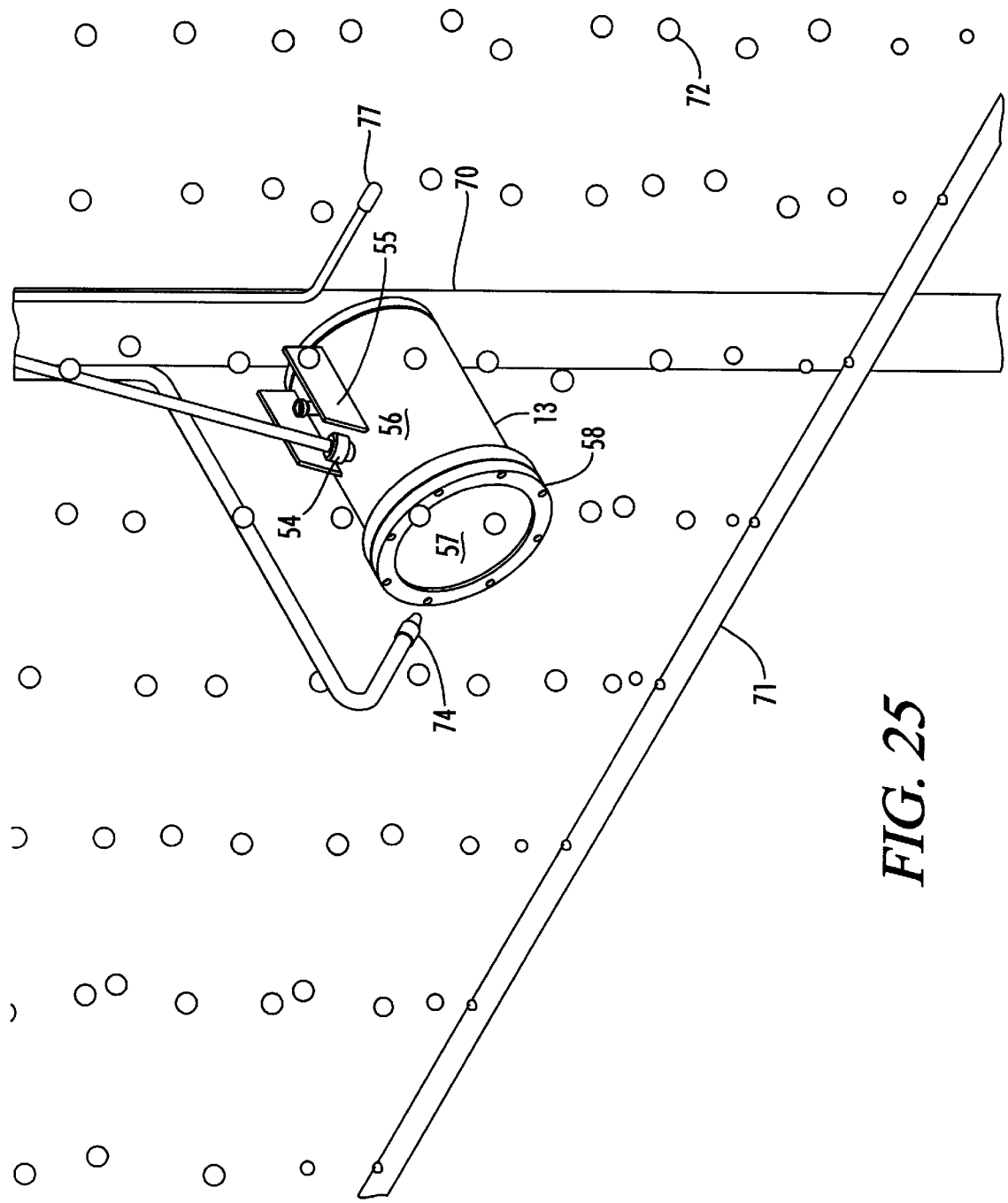
FIG. 25 is a perspective view of a single flash head as installed in the system underwater, showing a preferred arrangement of the air bubble curtain and a corresponding water jet.

Also looking at FIG. 25, a temperature probe 77 is shown positioned in the water near mounting rack 70 and a flash head 13. Probe 77 provides ambient water temperature data to the system control unit 5 for use as described below.

SYSTEM CONTROL UNIT

An important aspect of the system 10 is the high level of control and monitoring provided by system control unit 5 in the control center 12. Coordinating and controlling communications to and from all subsystems, the system control unit 5 provides both overall control and complete monitoring of all aspects of system operation. At least one system control unit 5 is required per system. The system control unit 5 performs the following functions:

a. monitor and control serial data communication to and from each flash head interface and control unit 99 within the control center 12;

b. optional monitoring and control communications from a remote control station using the remote control and monitoring software, via a data modem and conventional phone line;

c. generate and implement a user interface via a video display 101 to enable the entry of system commands and to report system status;

d. provide on/off control signals to an air compressor for generation of a bubble curtain at each flash head 13;

e. generate on/off control signals to a water pump to provide for water jet output at each flash head 13;

f. generate control signals for flash head cooling devices;

g. provide control signals to enable/disable flashing of each flash head 13;

h. configure and control flash head strobe sequence, including sequential ordering, flash spacing, and flash timing;

i. provide control signals to vary the flash intensity of one or more flash heads 13;

j. monitor and report water temperature proximate to each flash head; and k. monitor and report flash intensity at each flash head.

The system control unit 5 includes the following external inputs: communications with the flash heads 13; communications with remote control/monitoring software via modem and analog phone line (not shown); input from one or more temperature probes 77; and computer keyboard (not shown) with mouse (not shown).

In addition, the system control unit 5 has provisions for the following external outputs: communications with the flash heads 13; communications with remote control/ monitoring software; a video display 101; a printer (not shown); and relays (or similar device) to turn on/off an air compressor and water pump.

The system control unit 5 is under the control of software designed for the system 10 that, subject to system commands entered by the operator, includes routines to provide the following control services: print/display status report; log system activity to a printer; and enable/disable flashing on one, multiple or all flash heads 13; allow the configuration and initiation of flashing lights on separate flash heads 13 in a operator selected sequence; change flash intensity on one, multiple or all flash heads 13; turn air compressor on/off for bubble curtain output at flash heads 13; turn water pump on/off for water jet output at flash heads 13; turn flash head cooling fan 51 on/off on one, multiple or all flash heads 13; and generate alarms/warnings (including communications errors) for all parts of the system 10 that include the time, date, location and description of the malfunction (when the disruption has been repaired, the alarm listing is removed from the list).

The system control unit software also preferably includes monitoring routines to provide the following monitoring and reporting services: water temperature at each flash head 13; flash intensity at each flash head 13; and internal flash head temperature.

The video display 101 of the system 10 located in the control center 12 shows the configurations and status of the control center 12 and flash heads 13 in a tabular format providing for quick access and comparison of information. FIG. 5 shows a typical display screen monitoring the status of a flash head 13. The screens can further be modified to accommodate several flash heads 13 to be monitored simultaneously.

FLASH HEAD INTERFACE AND CONTROL UNIT

Each flash head 13 is mounted together with two other flash heads 13 to form a tri-pack of flash heads 13, as described below. Each flash head 13, in conjunction with its corresponding flash head interface and control unit 99 (shown in FIG. 26), contains an illumination device and related hardware used to attract and deter fish. In most cases, an installed system 10 will contain multiple tri-packs of flash heads 13 to adequately cover the area being serviced. The exact number of flash heads 13 used is dependent on many system parameters including the width and depth of the body of water, the system orientation to the body of water, and the relative locations of the areas where fish are to be directed away from and towards.

Each tri-pack of flash heads 13 is electrically connected via a single power and control cable 17 to a flash head termination rack 9, which is further connected to a flash head interface and control unit 99 mounted in part on a motherboard. The flash head termination rack 9 provides a connection between flash head interface and control unit 99 and the flash heads 13.

Each flash head 13 preferably includes the following external inputs: communications with its corresponding interface and control unit 99 (via cable 17 and termination rack 9), and including cooling fan control signals, and flash tube trigger signals; water temperature; and internal flash head temperature. Each flash head 13 has provisions for the following external outputs: communications with flash head interface and control unit 99 (via cable 17), including flash head temperature and water temperature.

FIGS. 4a, 4b, 4c, and 4d are collectively an electrical schematic of the analog circuitry of a flash head interface circuit 96. The flash head interface circuit 96 is used by the flash head interface and control unit 99 to control the illumination of one tri-pack of flash heads 13 connected to the termination racks 9. Since each flash head interface and control unit 99 is configured to control fifteen flash heads 13, each flash head interface and control unit 99 has five flash head interface circuits 96 identical to the one in FIG. 4a. Each flash head interface circuit 96 is therefore connected to the motherboard of the flash head interface and control unit 99.

FIG. 23 is a block diagram of the digital section of the flash head interface and control unit 99, also referred to as the timing and trigger board PCB11. The connections to the timing and trigger board PCB11 are labeled on FIG. 4a as "PCB11, Jx(Jy-z)", where x corresponds to a connector pin on the motherboard, y corresponds to a phoenix connector for the daughter card with the motherboard, and z corresponds to the pin number on the phoenix connector. In this embodiment, a single flash head housing 56 will enclose one flash tube 60 with related triggering circuitry. Preferably, there are six flash head interface and control units 99 located in the control center 12. Therefore, the system 10 will be able to control up to 90 flash heads 13 in 30 total tri-packs. Applicant herein will describe the interconnection and functioning of a flash head interface circuits 96, as illustrated on FIGS. 4a–4d, with the understanding that the same description applies as well to the remaining flash head interface circuits 96 of the other flash head interface and control units 99. Optionally, multiple flash tubes 60 with associated trigger circuitry can be installed in a single housing 56 and controlled in a similar manner.

Looking at FIGS. 4a and 4d, conventional 120 VAC electrical power is supplied to each flash head interface circuit through a power cable 17 connected at the breaker panel. Input power is distributed to the flash heads 13 as determined by relays K11 and K12. For those circuits and components requiring a DC supply voltage, AC power is sent via power transformer bank 21 (transformers T11–T14) to terminal block TB12, which is connected to high voltage rectifier board PCB14. For devices and components needing AC supply voltage, the 120 VAC supply is also stepped down as needed at power transformer bank 21 (transformers T11–T14). Further, tuning capacitor bank 22, including tuning capacitors C11, C12, C13, and C14, is connected across the primary windings of power transformers T11, T12, T13, and T14 of power transformer bank 21 to assist in regulation of the secondary output voltage to each flash head 13.

Trigger capacitor bank 23 contains capacitors C15–C19 that are used in conjunction with capacitor select relays K13 and K14 as a means for selectably adjusting the flash intensity of the corresponding flash head 13. Table I shows the range of selectable flash rates, corresponding to different capacitor selections and power settings.

TABLE I

SELECTABLE FLASH RATES, CAPACITOR SETTINGS AND POWER SETTINGS SHOWING POWER OPERATING RANGES

| Flash per Minute | Max Number of Capacitors Selectable | Range of Operational Power (Watts) |
|---|---|---|
| 60 | 4, 3, 2, or 1 | 640 to 20 |
| 72 | 3, 2, or 1 | 833 to 24 |
| 75 | | |
| 80 | | |
| 90 | | |
| 100 | | |
| 120 | 2 or 1 | 733 to 40 |
| 144 | | |
| 150 | | |
| 180 | | |
| 200 | | |
| 225 | 1 only | 300 to 800 |
| 240 | | |
| 300 | | |
| 360 | | |
| 400 | | |
| 450 | | |
| 600 | | |

CAP 4 AT 800 W = 1280 mF
CAP 4 AT 200 W = 320 mF
CAP 3 AT 800 W = 1000 mF
CAP 3 AT 200 W = 250 mF
CAP 2 AT 800 W = 440 mF
CAP 2 AT 200 W = 110 mF
CAP 1 AT 800 W = 160 mF
CAP 1 AT 200 W = 40 mF

Thus, the system operator can enter a system command at the system control unit 5 to select a particular flash intensity as part of the flash head configuration routine. The flash intensity selection is implemented by a corresponding flash intensity select signal being sent to relays K13 and/or K14.

The software in the system control unit 5 is preprogrammed with the parameters set forth in Table I which determine the safe operational limits of the particular flash head 13 to avoid overheating of the flash tube 60. Accordingly, the system control unit 5 internally monitors the configuration of each flash head 13, to prevent selection of flash head operational parameters which would expose the flash tube 60 to an overheating condition. Subject to these limits, in a preferred embodiment of system 10, each flash head 13 can be operated from between 20 to 800 watts with the flash rate adjusted on real time basis from between 60 to 600 flashes per minute. Depending on local ambient and operating conditions, on-site adjustment of the system may be needed to deal with heat management issues. If overheating of the flash heads 13 becomes a problem, a preferred method of solving the problem is to reduce flash head duty cycle by increasing the number of flash heads 13.

A flash tube current sense transformer PCB13 has its primary winding connected to the anode of terminal block TB11. The secondary winding of flash tube current sense transformer PCB13 is connected to timing and trigger board PCB11 so that an appropriate signal can be sent to the flash head interface circuit 96, verifying functioning of each flash tube 60 of the tri-pack configuration. The cathode of terminal block TB11 is further connected to terminal block TB12. The flash heads 13 are connected in parallel to the cathode and anode of terminal block TB11 which triggers each of the three flash heads 13 of the tri-pack configuration according to the current supplied. Transformers T15–T17 of triggering transformer bank 24 are connected to trigger ports 1-3 of terminal block TB11 to provide power to each flash head 13 according to the duration and intensity desired.

Furthermore, because the current supplied to each flash head 13 is provided through the parallel connection to terminal block TB11, each flash head 13 operates on one-third of the duty cycle that would be applied for a single connection to one flash head 13.

Furthermore, from FIG. 4a, flash intensity signals originate from timing and trigger board PCB11 and are sent to relays K13 and K14, which determine the intensity and duration of each flash by the current supplied to the ports of terminal block TB11.

The temperature sensors (shown in FIG. 4b) associated with the flash heads 13 are connected at the flash head termination rack 9 with the flash head interface circuit 96. The temperature sensors (preferably conventional thermistor type sensors) provide temperature data from each individual flash head 13. This data is sent to temperature sensing board PCB12 for analysis by the system control unit 5.

FIG. 23 illustrates the various fumctional blocks of timing and trigger board PCB11 and their interconnection. Basic flash head control is provided by a conventional microprocessor 80 which receives analog data input from the system 10, shown as block 81, and performs a multiplexed analog-to-digital conversion of that data (flash head temperature, capacitor bank voltage, line voltage, trigger voltage, and flash sensing) of the system 10 to configure and adapt processor 80 to perform the functions required by the system. A random access memory chip 83 provides static memory for use of processor 80 while a read only memory chip 84 (EPROM) contains the software which provides the basic operating system functions for the processor 80. An electrically erasable read-only memory chip (EEPROM) stores the system's configuration in the event of a power loss.

From FIG. 23, the outputs from processor 80 to system 10 are provided through decoder block 85 and latch block 86. These in turn provide trigger signals through trigger circuit 90 to trigger operation of flash tubes 60 in the various flash heads 13, through the flash head interface circuit 96 shown on FIG. 4a. Finally, control of the various system signals for operation of system accessory devices, specifically the air compressor and water pump, are provided through accessory control block 92. Serial communications between the timing and trigger board PCB11 and the system control unit 5 are provided through a serial communications interface 87, which includes both a conventional RS232 system diagnostics port 89 and a conventional RS485 serial port 88. Interface output connector 95 mechanically and electrically connects the outputs from timing and trigger board PCB11 to the other corresponding sections of system 10. Analog input signals are provided to timing and trigger board PCB11 through input interface connector 94.

FLASH HEADS

FIGS. 9–20, 24, and 25 illustrate the structure and internal arrangement of components used in flash head 13. Because in a typical installation of system 10, each flash head 13 will be submerged in a body of water associated with a fixed structure to be protected by the system 10, each flash head 13 includes a water proof protective outer housing 56 having an opening at one end covered by a light transmissive lens 57 sealed with a circumferential retaining ring 58, a lens shim 73, and an O-ring seal 75 (see FIG. 9). In a preferred embodiment of the flash head 13, the housing 56 (see FIGS. 10a, 10b, and 10c) will be fabricated from type 6061 Aluminum.

Figure 16:
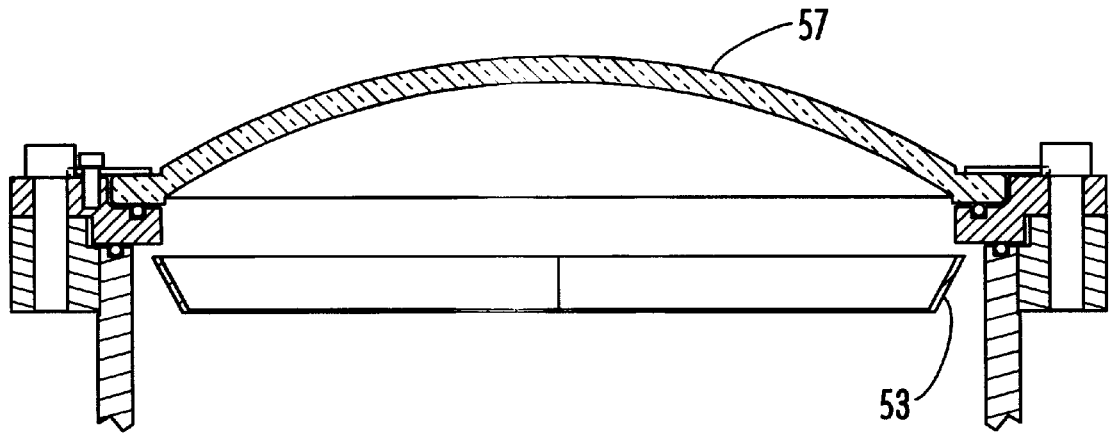
FIG. 16 is a side view of the lens and parabolic reflector.
Figure 17:
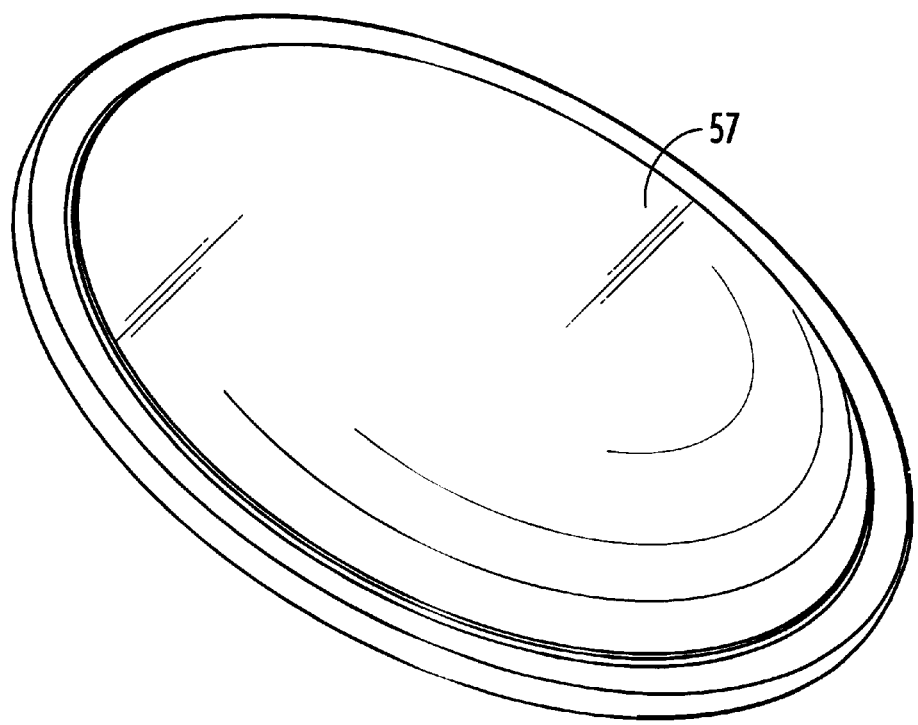
FIG. 17 is a plan view of the lens.
Figure 18A:
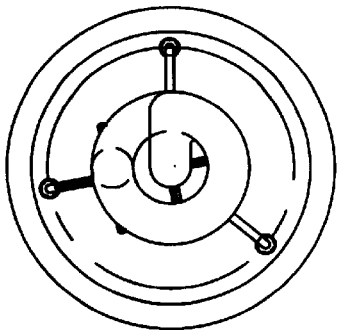
FIG. 18a is a top view of the helical flash tube.
Figure 18B:
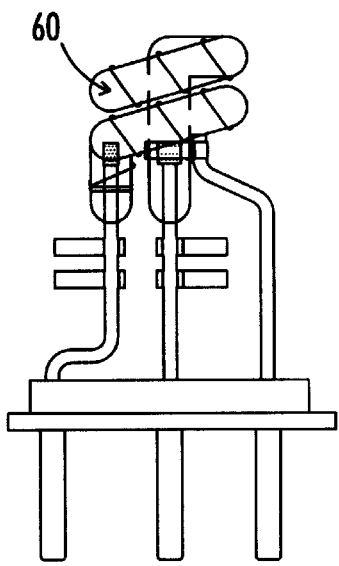
FIG. 18b is a side view of the helical flash tube.
Figure 18C:
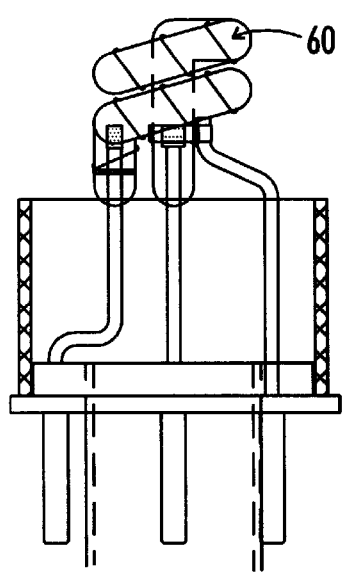
FIG. 18c is a side view of the helical flash tube of FIG. 18b, with the flash tube leads enclosed in a heat resistant glass cylinder.
Figure 18D:
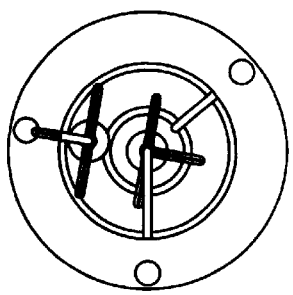
FIG. 18d is a bottom view of the helical flash tube.

The lens 57 of the flash head 13 is made of tempered borosilicate glass, and is curved so as to provide the most effective distribution of light (see FIG. 16). The lens 57 can be made with a diffiaction pattern (see FIG. 17) to effectively disperse light in a short, broad pattern or with a clear, refractive mechanism to penetrate a greater distance with the light.

A water tight cable fitting 54 (see FIGS. 24 and 25) extends from and through housing 56 to allow for entry of the power and control cable 17. Two parallel plates 55 are welded to housing 56 as trash shields and to protect cable fitting 54.

The selection and arrangement of components internal to flash head 13 illustrates some of the novel features of system 10, as implemented in flash head 13, which optimally adapts the flash heads 13 for extended use in a submerged environment. The flashed illumination from flash head 13 is provided by a flash tube 60, preferably a xenon flash tube that is helically shaped (shown in FIGS. 18a–18d), supported by a flash tube mount 46 (see FIG. 11a) and enclosed within a protective Pyrex glass cylinder 49. Each flash tube 60 will include three rigid electrical connections attached to flash tube mounting lugs 7 supported by flash tube mount 46 (see FIG. 11b). The electrical connections are anode 61, cathode 62, and trigger input 63.

Because of the tremendous energy and heat generated by flash tube 60 when triggered, special novel heat management precautions have been taken in the design of flash tube 13. A squirrel cage fan 51 is mounted below the flash tube 60 (see FIG. 9) to force nitrogen around flash tube 60 through a Pyrex glass air duct 59. The squirrel cage fan 51 is mounted to the inner portion of the bottom wall of enclosure 56 by squirrel cage fan base plate 52 (see FIG. 9).

An annular parabolic reflector 53 (shown in FIGS. 15a and 15b) circumferentially surrounds flash tube cylinder 49 (see FIG. 11b) to maximie the amount of light directed outward of flash head 13 through lens 57. Because of the desire to maximize flash intensity in a submerged location, parabolic reflector 53 includes a centrally disposed annular opening to allow passage of air duct 59, thus minimizing the loss of light due to impairment of the reflective surface. Also, the parabolic reflector 53 is preferably coated with Everbrite 95® to give a reflectivity of 95%.

Also, as compared to conventional flash tubes, anode and cathode leads 61 and 62 (see FIG. 14) have an enlarged diameter, preferably approximately 0.100 inches. Further, from FIG. 24, a pair of heat sink fins 65 extend radially outward from leads 61 and 62. These structural features promote heat transfer away from flash tube 60.

Figure 19:
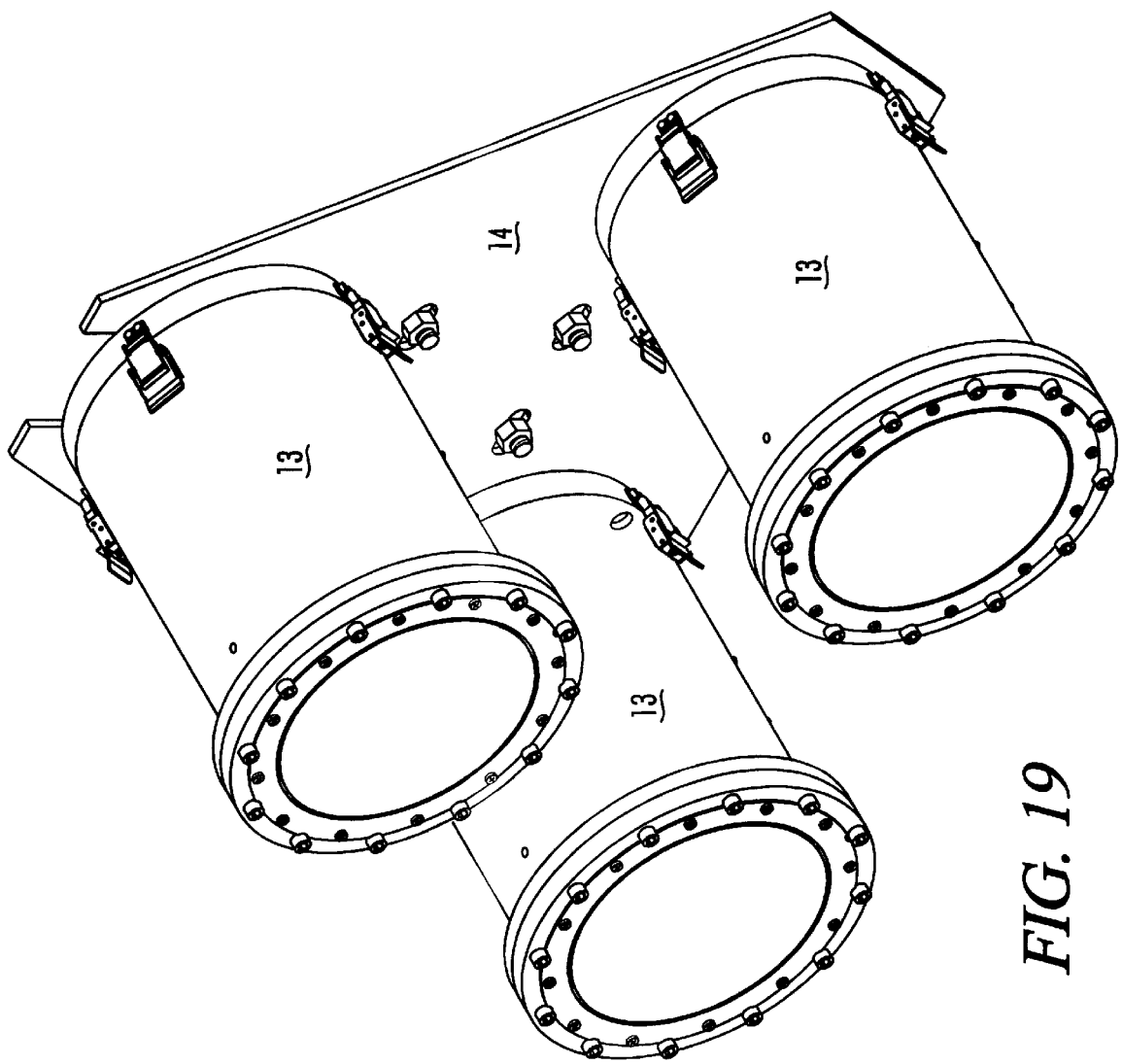
FIG. 19 is a perspective view of three flash heads mounted in a tri-pack configuration on a flash head mounting plate.

Looking at FIG. 19, the flash heads 13 are further mounted together in groups of three as a tri-pack on a flash head mounting plate 14. The mounting plate 14 has three circular indentations 16 at each of the three corners that allows for secure locking of the circular flash head housing 56 to the mounting plate 14. Further, the arrangement of the flash heads 13 in a triangular shape allows for the most effective dispersion of light while under water. By using the tri-pack arrangement of flash heads 13, each flash head 13 of the tri-pack will be illuminated during one-third of the duty cycle. Because each flash head 13 operates during one-third of the duty cycle, the system 10 can produce faster flash rates than when each flash head 13 operated using the entire duty cycle. This furthermore reduces the operation time of the individual flash heads 13 by two-thirds, which allows for increased reliability of the flash tubes 60 and longer life for the flash tubes 60.

Of course, the nitrogen being circulated internal to each flash head 13 must be cooled and, because the nitrogen cannot be exhausted, a novel nitrogen recirculation and cooling system is provided within flash head 13. A shroud 48 and reflector 53 forms a nitrogen plenum shroud 48 around flash tube 60. However, the diameter of the plenum shroud 48 is selected so that when installed, an nitrogen passageway 64 is defined between the outer surface of the plenum shroud 48 and the inner surface of flash head enclosure 56. Accordingly, nitrogen circulated within flash head 13 by the squirrel cage fan 51 is forced through nitrogen passageway 64 where it is cooled by coming into contact with housing 56. The housing 56 is itself cooled by the effects of ambient water temperature when flash head 13 is submerged. Mounting brackets 43 mechanically attach parabolic reflector 53 to the plenum shroud 48.

Flash tube mount 46, shroud 48 and squirrel cage fan 51 are secured to a sheet metal weldment 42. The weldment 42 is attached to three support posts 65 (FIG. 9) welded to housing 56.

Figure 14:
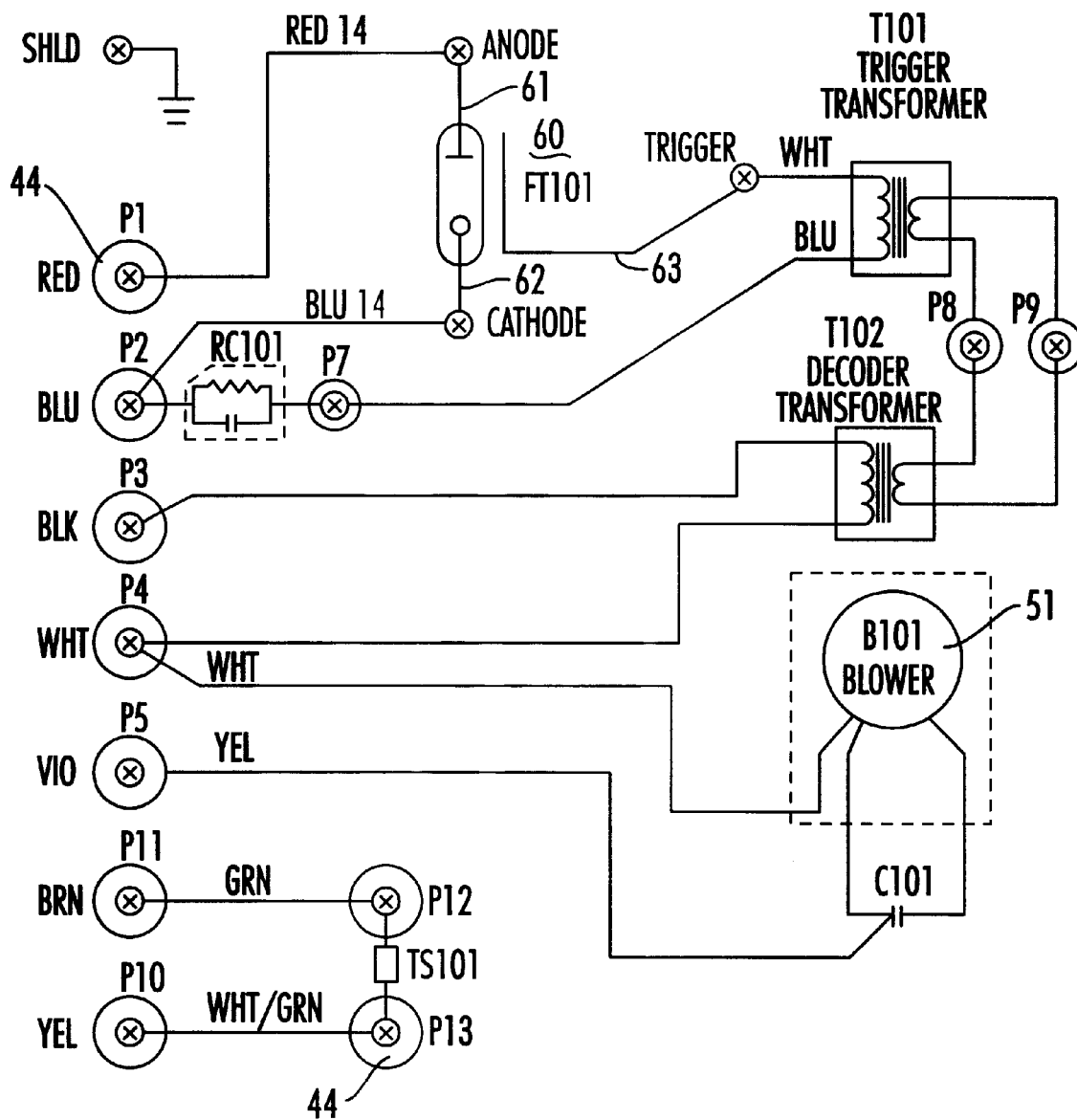
FIG. 14 is a schematic diagram of the flash head electrical system.
Figure 11A:
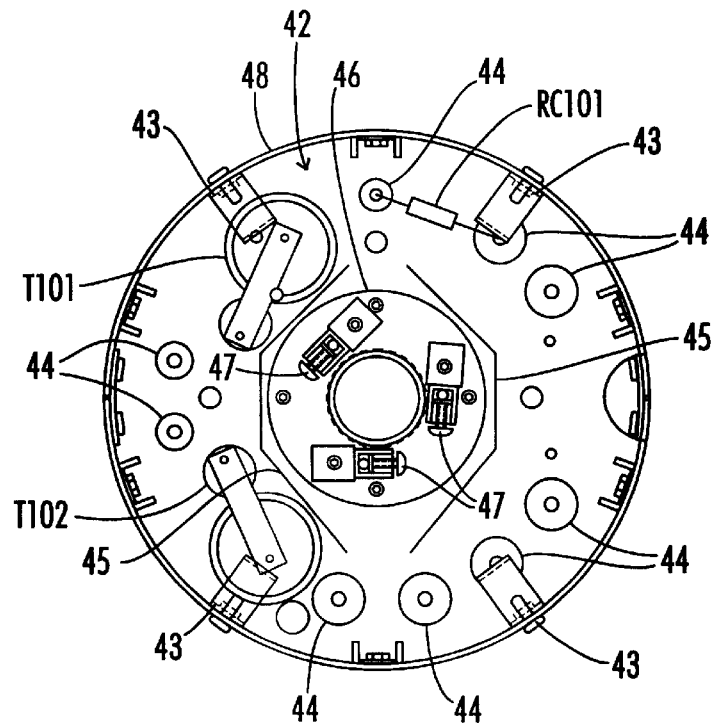
FIG. 11$a$ is a plan view of a flash head showing the plenum shroud and components internal thereto.
Figure 11B:
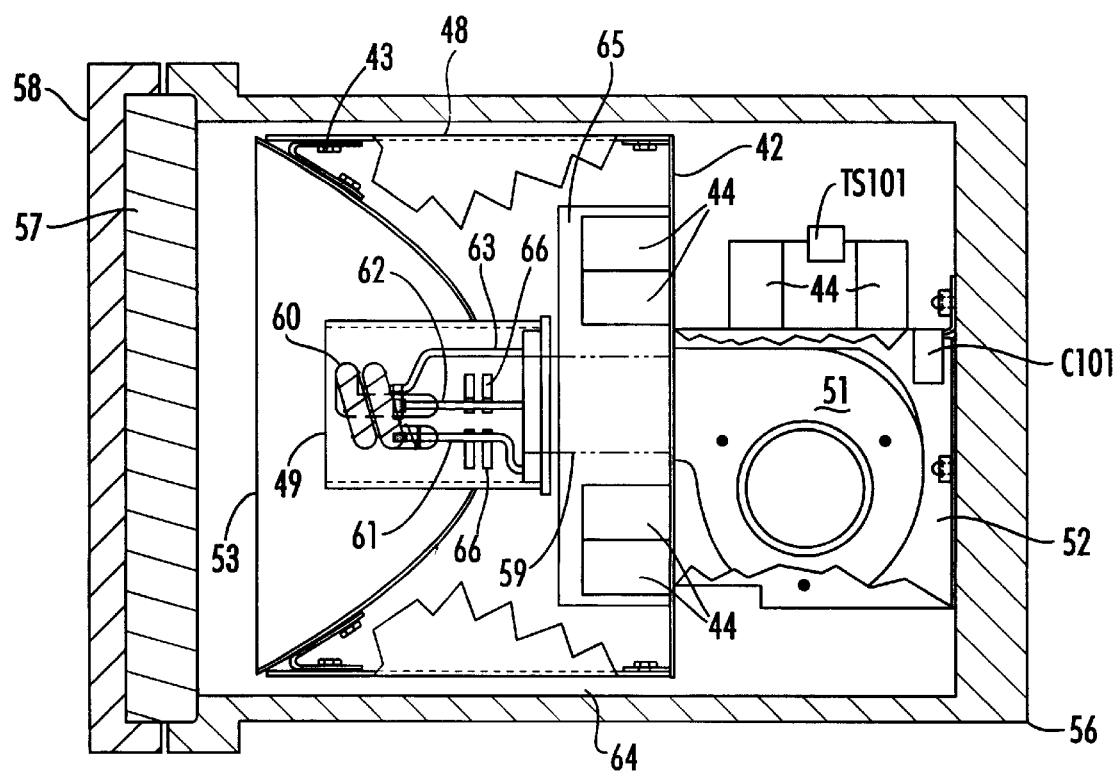

Flash head electrical components, shown in part on FIGS. 11a–11b, are electrically connected to one or more ceramic posts 44 arranged around and attached to the bottom wall of the plenum shroud 48. Further, FIG. 14 is a schematic diagram of the electrical components and interconnections in flash head 13. A series of wire terminals P1 through P11 (each of which corresponds to a ceramic post 44 on FIG. 11a) provide a connection point for the individual flash head power and communication wires contained within flash head power and control cable 17. Thus, flash tube power is brought to the anode and cathode of flash tube 60 through terminals P1 and P2, respectively. The cathode power from the flash head interface and control unit 99 is also connected to the secondary winding on trigger transformer T101, through an R-C filter network RC101. The flash tube trigger signal is received from the control center 12 at terminals P3 and P4 and, through decoupling transformer T102, drives the primary winding of trigger transformer T101 connected at terminals P8 and P9.

One of the components mounted interior to flash head 13 but outside the space enclosed by the plenum shroud 48 is a temperature sensor TS101 (shown schematically in FIG. 4b). Temperature sensor TS101 provides electrical signals responsive to the internal flash head temperature for use by the control center 12 in monitoring and regulating the operation of each flash head 13. In a preferred embodiment of flash head 13 as described, the safe internal temperature operating range is 14–122 degrees F.

To provide some level of thermal isolation of the electronic components of flash head 13 from the heat generating effects of flash tube 60, a pair of opposed heat shields 45 extend vertically from the lower wall of the plenum shroud 48 and up along the outer wall of duct 59 to a distance above the upper margin of the installed electrical components.

Terminals P4 and P5 of flash head 13 provide power to squirrel cage fan 51 at fan motor start-up capacitor C101. Further, temperature data is transmitted back to the control center 12 from temperature sensor TS101 through wires terminating in terminals P10 and P11.

Figure 9:
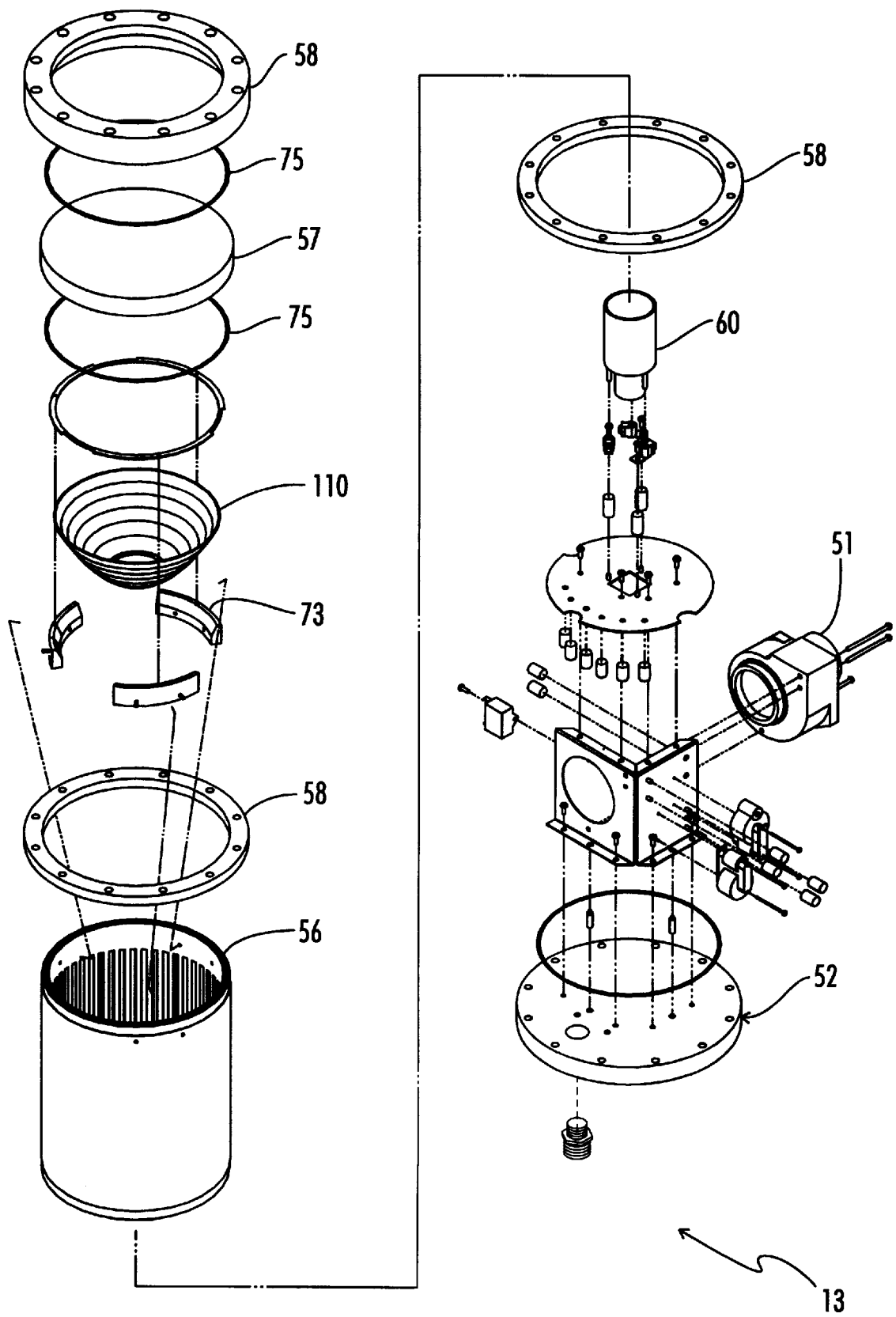
FIG. 9 is an exploded perspective view of a single flash head, showing the lens, parabolic reflector, helical flash tube, squirrel cage fan and lens clamping ring.
Figure 10A:
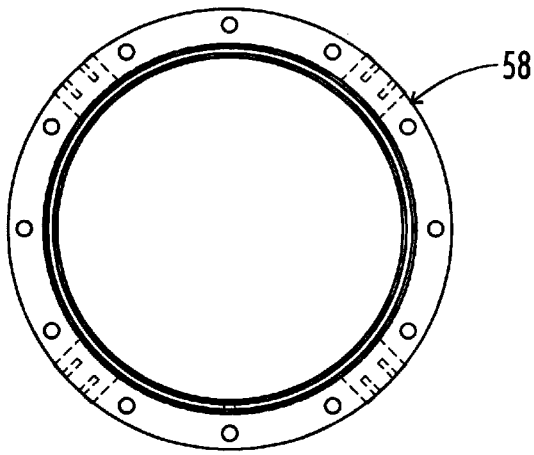
FIG. 10$a$ is a top view of a flash head housing.
Figure 10C:
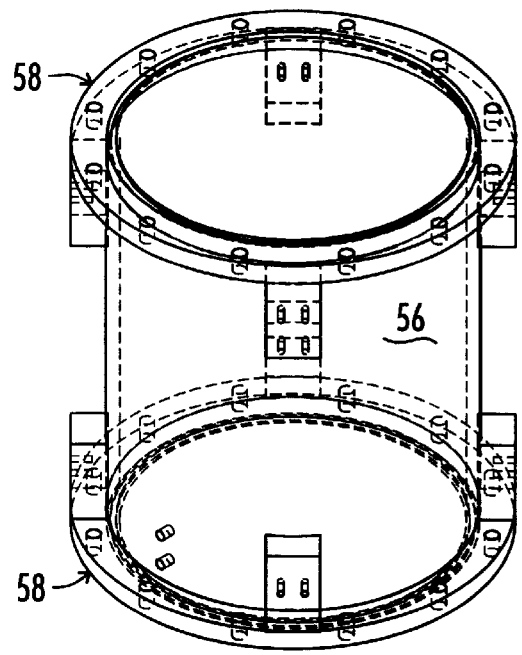
Figure 10B:
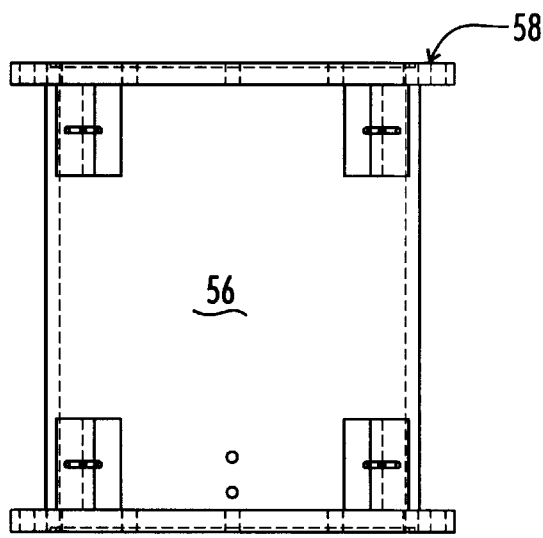
Figure 12:
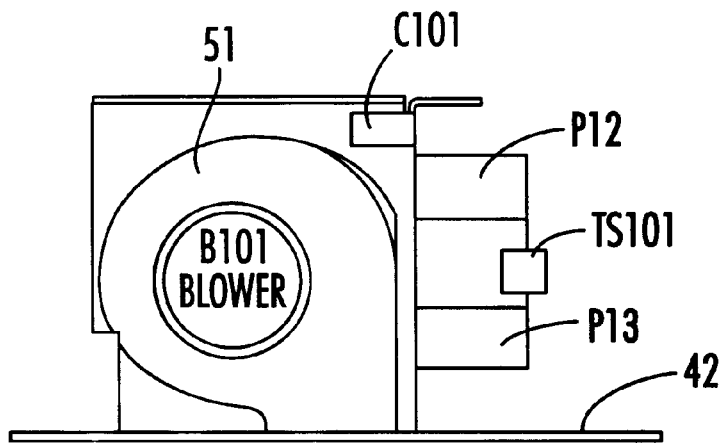
FIG. 12 is a view taken along lines A—A of FIG. 13, showing the fan portion of the flash head
Figure 13:
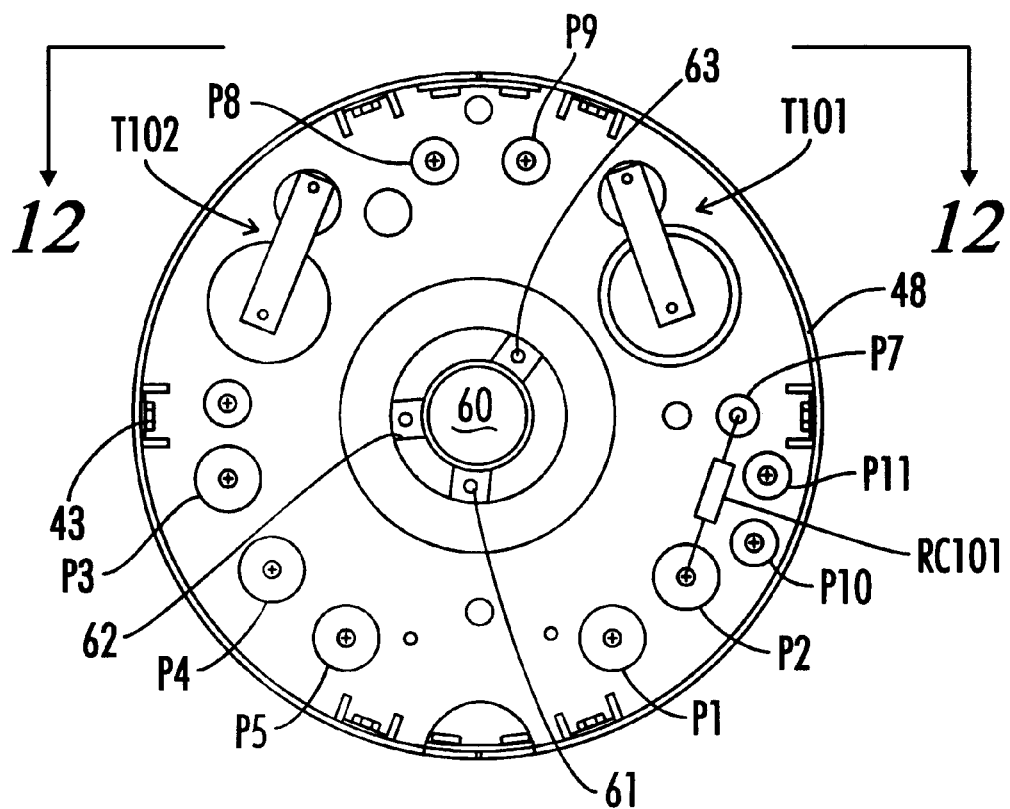
FIG. 13 is a plan view of the flash head interior to the plenum shroud, with the parabolic reflector removed, showing the location of electrical components and connection terminals.
Figure 14:
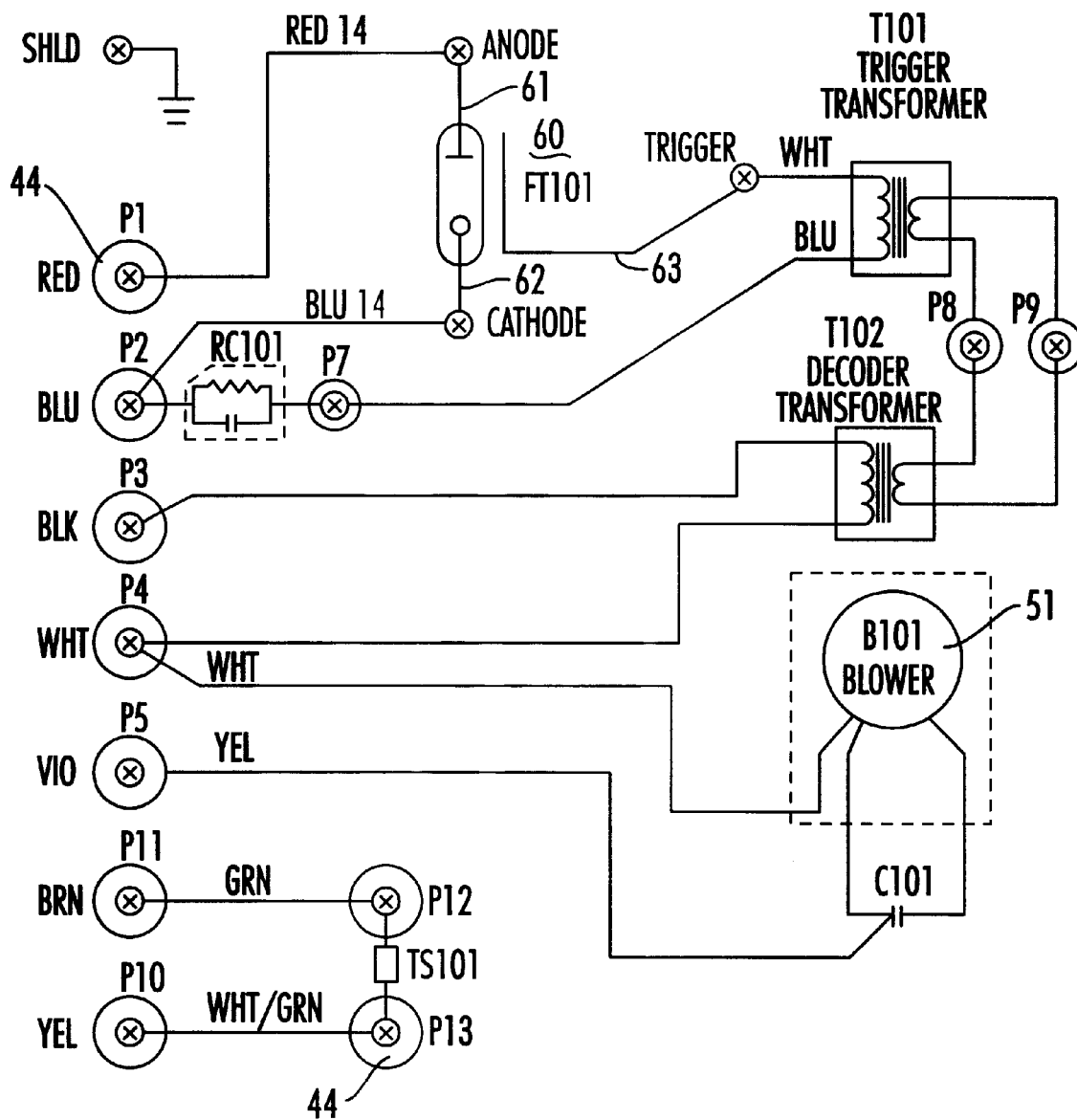
Figure 15A:
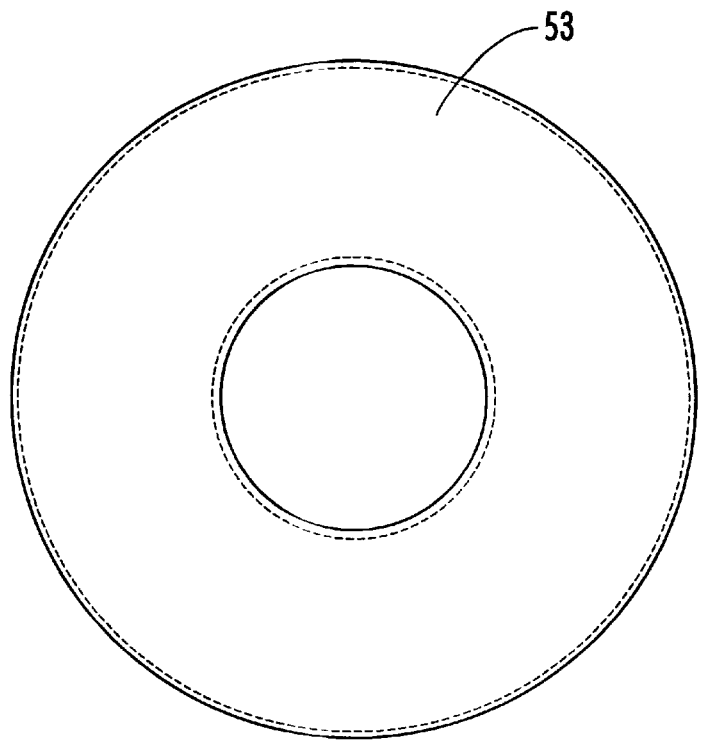
FIG. 15a is a front view of the parabolic reflector.
Figure 15B:
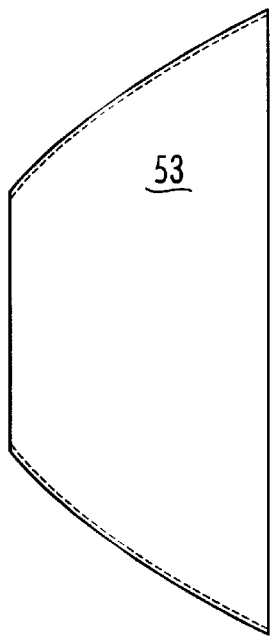
FIG. 15b is a side view of the parabolic reflector.

FIG. 13 shows the physical location within flash head 13 of the wire terminals P1 through P11 and the other electrical components of FIG. 9. FIG. 12 is a view taken along lines A—A of FIG. 13, showing the squirrel fan 51 used in the flash head 13.

SYSTEM OPERATION

The control center 12 has two serial communication interfaces for interconnecting to a host computer and running diagnostics. The first port is based on the RS485 standard and allows any number of computers to be daisy-chained to the system control unit 5 for configuration and data collection. A second communication port is based on the RS232 standard and is used for interfacing to the serial port of the personal computer of the system control unit 5 in order to run diagnostics by utilizing any type of terminal emulator. The communications between the system control unit 5 and the flash head interface and control unit 99 will consist of a standard RS-485 2-wire communications link.

The format of all messages passed between the system control unit 5 and the flash head interface and control unit 99 will be consistent. Address 0 is reserved for use in broadcast messages. The system control unit 5 will use their addresses in both sending and receiving messages. The system control unit 5 will listen to all messages and therefore requires no specific address. It will use the address to determine which flash head interface and control unit 99 is sending a message.

Each message will have the following Message Format:
Byte 0: Unit Address Message is for/from
Byte 1: Message Type
Byte 2-3: Message Length
Byte 4-(n-1): Message Data
Byte n: Checksum The communication scheme requires most messages to be acknowledged upon receipt. Messages requesting a response will accept the response as the acknowledgment. Other than broadcast or poll messages, messages not requesting a response require a separate ACK (message acknowledged) or NAK (message not acknowledged) to be sent. Broadcast messages are addressed to all devices so there is no use in one particular device responding. Poll Messages are sent by the system control unit 5 to each flash head interface and control unit 99 to request updated information.

ACK or NAK responses are based on several items: 1) correct checksum received; 2) correct #-of-bytes received (matches message length); 3) no communications errors detected (parity error, SW or HW overrun errors, etc.). ACKnowledging (or NAKing) the receipt of a message is performed regardless of whether the message type is processed by the receiving unit. This allows new messages to be created for other devices on the same communications link without modifying the software in all units. The capability to send variable length messages also allows new information to be added to an existing message without changing the software in all units. The system control unit 5 without upgraded software will only process the information they know about and will ignore new information added to the end of the message.

Communications messages from the system control unit 5 to the flash head interface and control unit 99 will include:

1. Set General Parameters (i.e. Date, Thme, etc.);
2. Synchronize Now (begin flashing according to preset configuration parameter set up by flash sequence commands;
3. Set Current Flash Head Configuration for each flash head 13 including: a) Flashing or not; b) flash rate; c) flash intensity; d) flash head flash wavelength/color selection; e) time delay from Sync signal used for sequencing flashes;
4. Set Present Flash Head configuration per flash head 13 including: a) Flashing or not; b) Flash rate; c) Flash intensity; d) flash head flash wavelength/color selection; e) time delay from Sync signal used for sequencing flashes;
5. Set Accessory Relays On/Off for: a) air bubble curtain; b) water jets; c) flash head cooling fan;
6. Reset alarm and/or warning condition;
7. Request General Parameters (i.e. Date, Time, etc.);
8. Request Software Version;
9. Request Current Flash Head Configuration per flash head 13;

10. Request the status of Accessory Relays On/Off;

11. Request status of other inputs including water temperature (all depths).

The communications from the flash head control unit 99 to the system control unit 5 include:

1. General Parameters (i.e. date, time, etc.);
2. Software Version;
3. Alarm and Warning conditions;
4. Current Flash Head Configuration per flash head 13;
5. Status of Accessory Relays On/Off; and
6. Status of other inputs including water temperature.

For operator convenience and flexibility at the system control unit 5, the system application software loaded in the personal computer (not shown) provides a user friendly graphical user interface (GUI) with a tabular format at a video display 101, such as provided by the Windows 95 operating system. The tabular format (shown in FIGS. 5–8) allows the user to see the various controls at the bottom of the screen and allows for quick access of information, and further allows easy access to each section of control information for comparison to other values via using the mouse to choose the desired tab.

Figure 6:
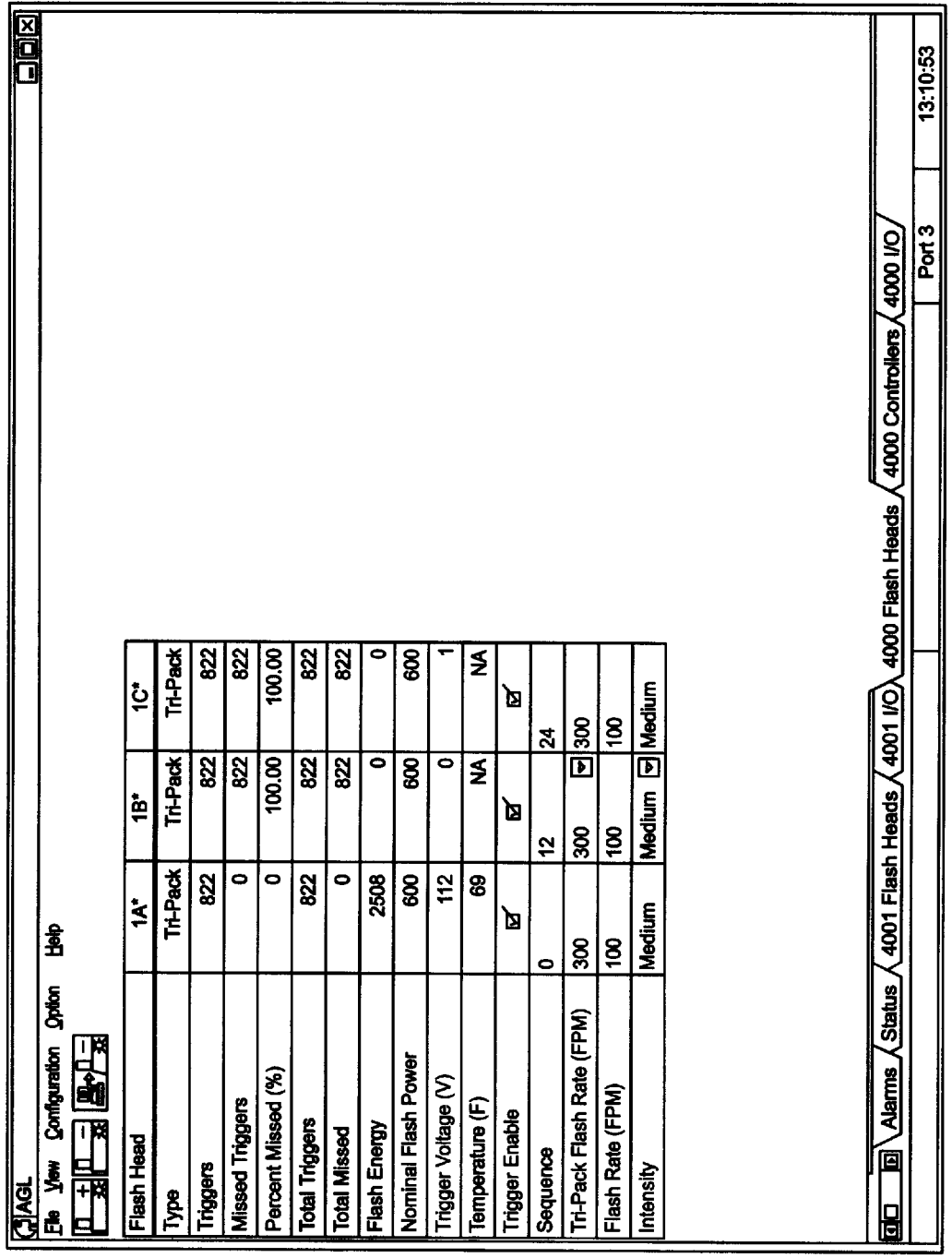
FIG. 6 is an illustration of a typical video display screen presented to a system operator at the system control unit for monitoring real time data of a tri-pack of three flash heads.
Figure 7:
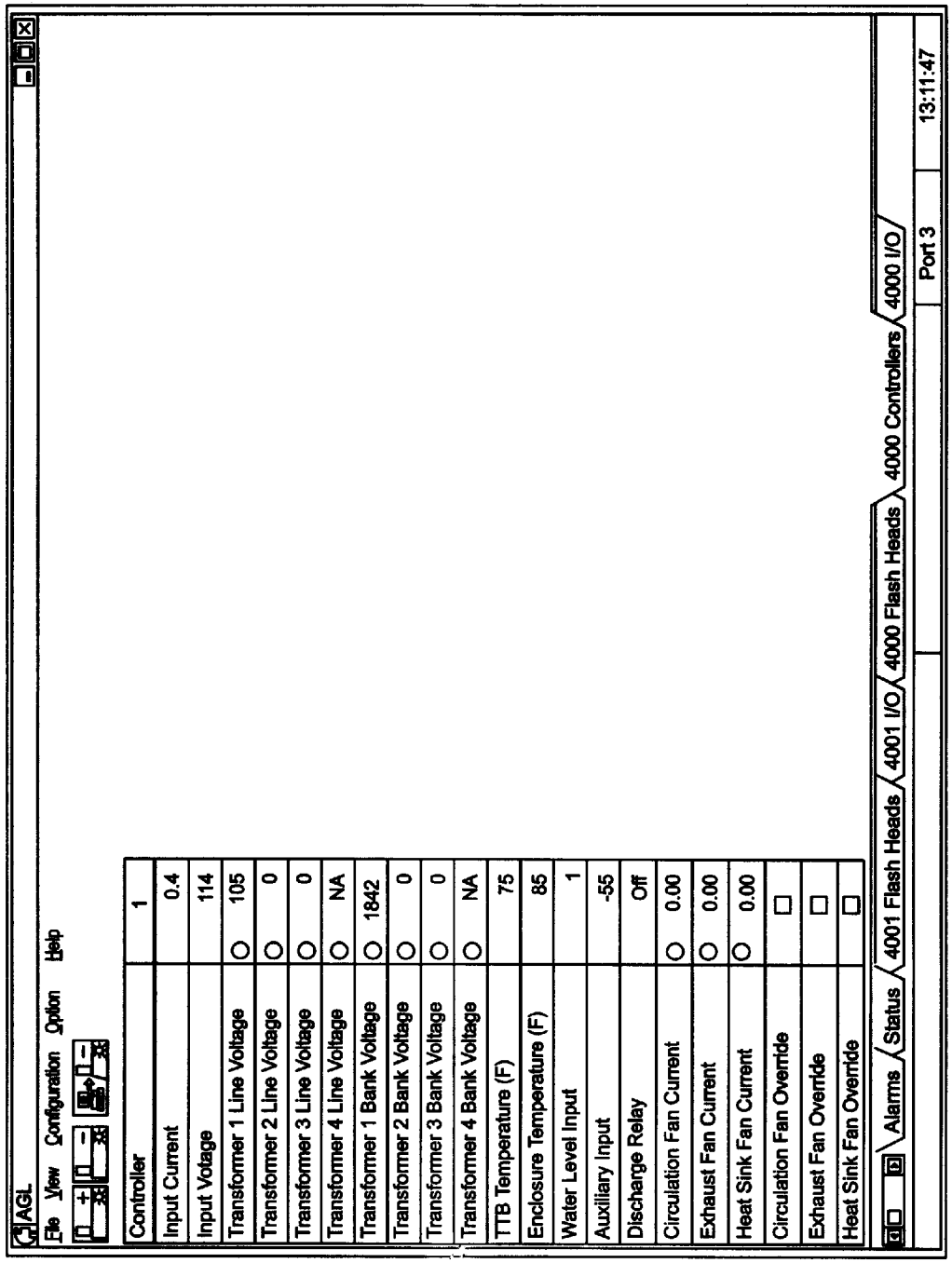
FIG. 7 is an illustration of a typical video display screen presented to a system operator at the system control unit for monitoring real time data for a single transformer bank.
Figure 8:
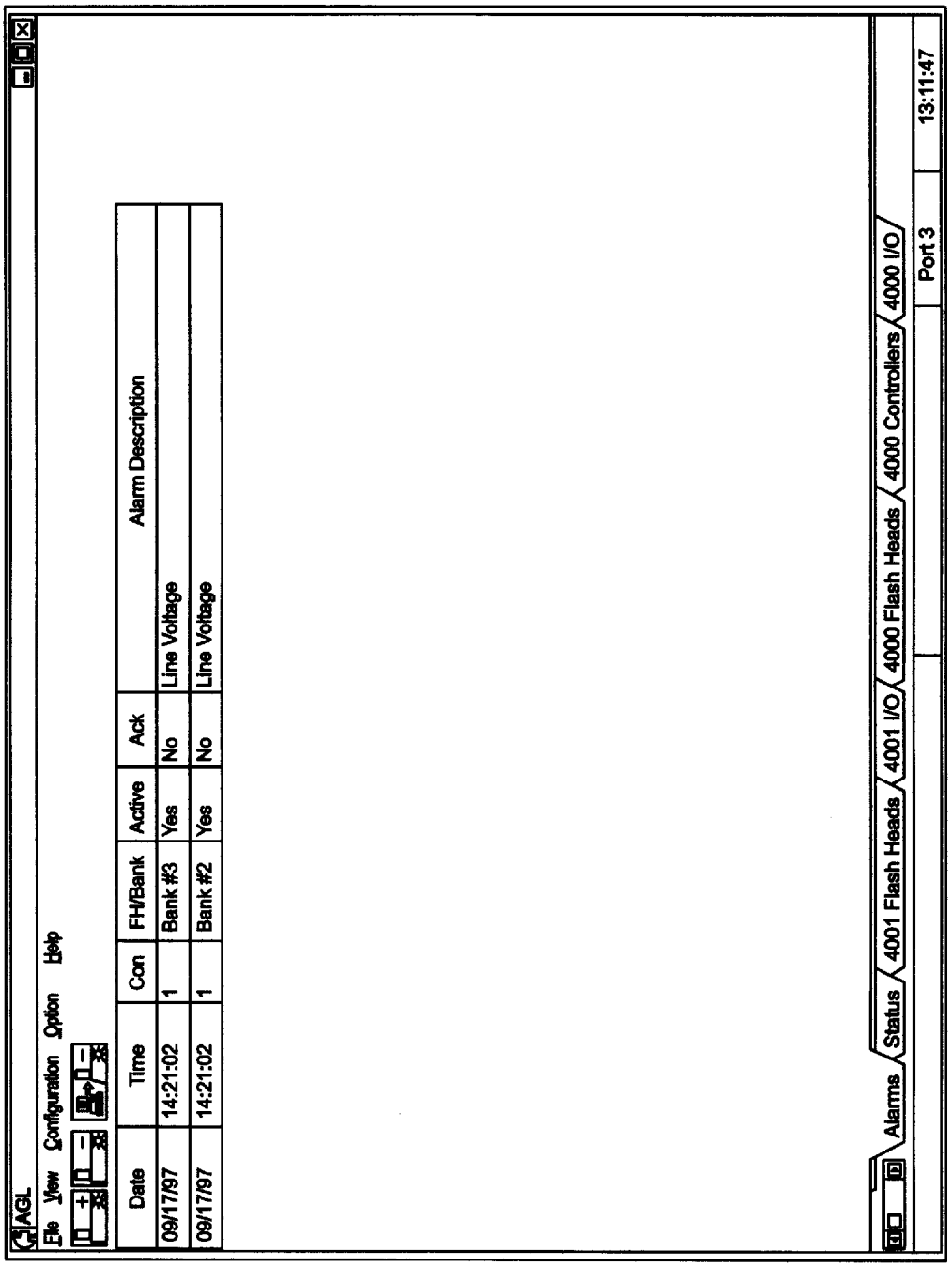
FIG. 8 is an illustration of a typical video display screen presented to a system operator at the system control unit when the system is displaying an alarm condition.

FIGS. 5–8 illustrate typical GUI screens presented to the system operator at video display 101. Thus, FIG. 5 is the GUI screen that would be used by the operator when checking the status of a flash head 13. FIG. 6 is the GUI screen presented to the operator for monitoring real time data for one flash head 13 of the tri-pack. FIG. 7 is the GUI screen presented to the operator that displays a typical status screen monitoring real-time data for a single transformer bank. Finally, FIG. 8 is the GUI screen presented when there is a system alarm. The alarms displayed are removed from the list automatically once the alarm has been acknowledged by the operator or once the malfunctioned element is repaired.

REMOTE CONTROL OPERATION

Although the system 10 is self-contained and has an easily accessible personal computer in the system control unit 5, the system 10 and the control center 12 are also configured for optional remote operation by use of remote control and monitoring software installed on a personal computer that allows a user to dial into (via modem and telephone line), control and monitor the system 10 from a remote location. This program can be used in place of or in addition to on-site personnel located located at the system site.

The remote control and monitoring software handles the same communications and provides the same level of control and monitoring as the software used at the system 10.

TYPICAL SYSTEM INSTALLATION

Figure 20:
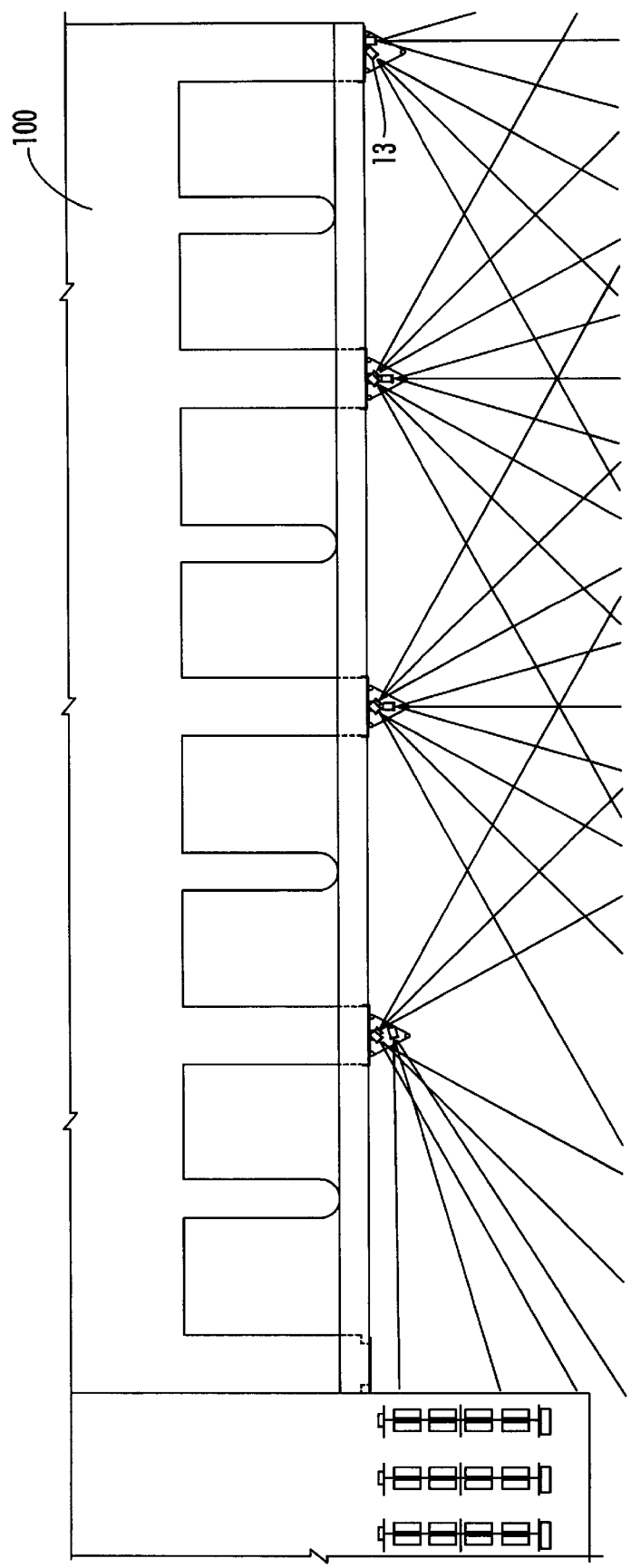
FIG. 20 is a plan view of the system of the present invention showing a typical installation adjacent to a hydroelectric facility having multiple turbine intakes.
Figure 21:
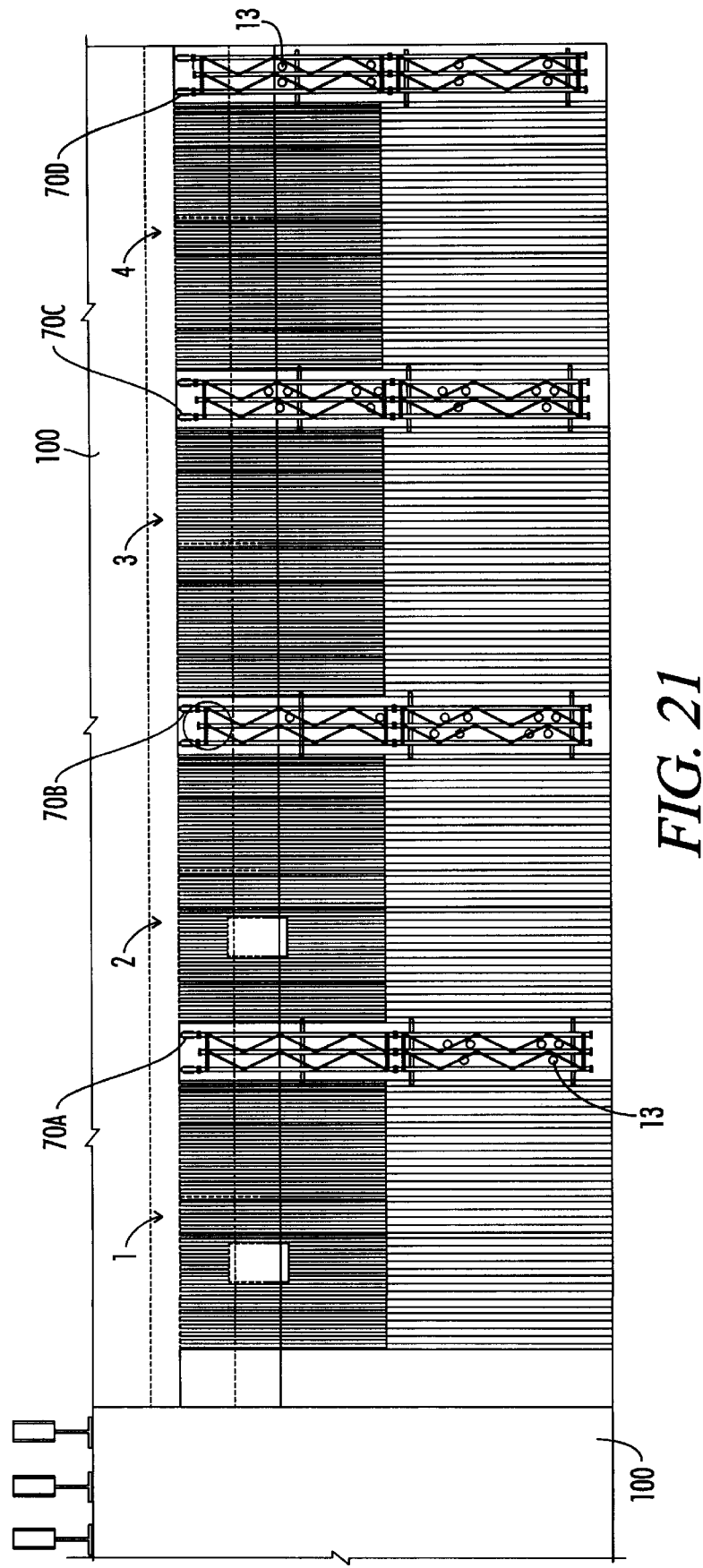
FIG. 21 is a front view of the system installation of FIG. 20, showing placement of the flash heads below the water line.
Figure 22:
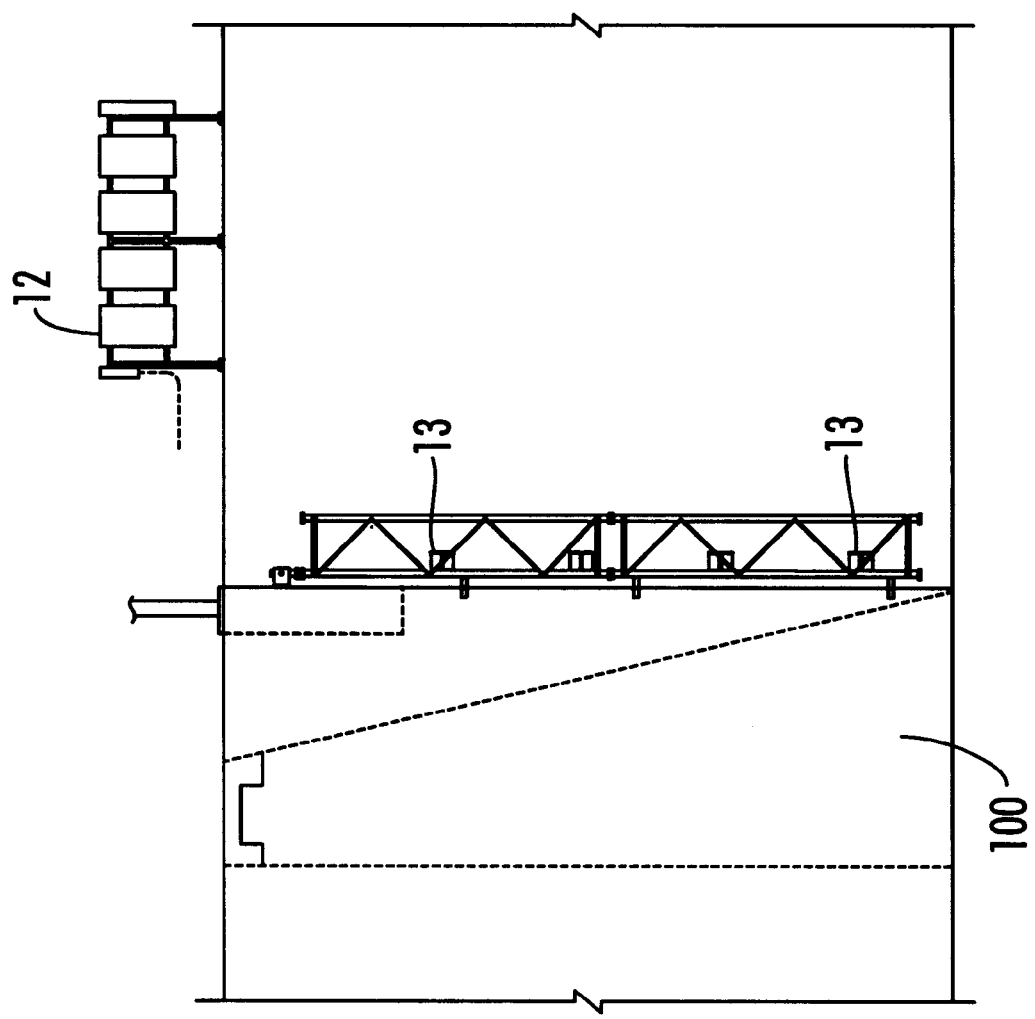
FIG. 22 is an end view of the installed system of FIGS. 20 and 21.

FIGS. 20, 21, and 22 illustrate a typical installation of system 10 near 10 the underwater portion of a hydroelectric facility 100, including four turbine intakes. The tri-packs of flash heads are bed-railed to flash head mounting racks 70a, 70b, 70c, and 70d that extend vertically down the side wall of the structure 100. Each flash head mounting rack 70 supports multiple tri-packs to provide a preferred pattern of flash illumination for fish who may approach the structure. The control center 12 is located on top of the structure 100 proximate the flash head racks 70 and connected to the flash heads 13 by cables 17. Preferably, the end portions of racks 70 that are not submerged are attached to structure 100 in a hinged arrangement so that the flash heads 13 can be accessed above water for any maintenance needed.

In a typical installation such as that shown in FIGS. 20, 21, and 22, the tri-pack of flash heads 13 are operated at three hundred forty (340) flashes per minute with a typical flash intensity of 400 watts. The flash heads 13 create a "wall of light" in front of the turbine intakes. Assuming that turbine intakes 3 and 4 on FIG. 21 have fish bypass areas that allow for safe passage, fish can be guided to those areas by flashing the flash heads on the flash head racks 70 adjacent to turbine intakes 1 and 2 together. In addition, the flash intensities of the flash heads 13 on the flash head racks adjacent to turbine intakes 3 and 4 can be gradually decreased as the depth is decreased, directing the fish upward towards the safe passage area.

Thus, although there have been described particular embodiments of the present invention of a new and useful controllable strobe light system for control of fish, it is not intended that such references be construed as limitations upon the scope of this invention except as set forth in the following claims. Further, although there have been described certain operational parameters used in the preferred embodiment, it is not intended that such dimensions be construed as limitations upon the scope of this invention except as set forth in the following claims.

What is claimed is:

1. A system for directing the movement of fish in water near a man made structure, the system comprising:

a. a plurality of flash heads, each flash head including a flash tube means for generating one or more light pulses visible to fish proximate to the flash head, and a waterproof housing enclosing the flash tube means;

b. a system control unit operatively connected to each flash head and including processor means for causing the flash tube means to generate the light pulses in a predetermined flash sequence;

c. the system control unit further comprising a command interface means for accepting system commands from an operator of the system, the system commands including flash sequence commands, the processor means including sequence command processing means for varying and executing the flash sequence in response to the flash sequence commands; and d. the system control unit installed in a trailer to allow mobile transportation of the system.

2. The system of claim 1, the system control unit further comprising system monitor means for providing system status signals to the operator, the system status signals including flash sequence status signals corresponding to the flash sequence being executed by the processor means.

3. The system of claim 2, wherein the processor means comprises a personal computer, the command interface means comprises a keyboard operatively connected to the personal computer, and the system monitor means comprises a video display operatively connected to the personal computer.

4. The system of claim 3, the system control unit further comprising flash head signal receiver means for receiving flash head status signals from each flash head, the flash head status signals including a signal indicating whether a flash head is flashing or not flashing, and wherein the system monitor means includes means for displaying the flash head status signals.

5. The system of claim 4, the system commands entered by the operator including flash intensity commands, the system control unit further comprising flash intensity control means to adjust the intensity of the light pulses generated by each flash tube means of each flash head in response to the flash intensity commands, and wherein the system status signals displayed on the video display include signals indicative of the flash intensity of each flash tube means of each flash head.

6. The system of claim 5, the flash head signal receiver means comprising a current sense transformer.

7. The system of claim 5, the system commands entered by the operator including flash color commands, the system control unit further comprising flash color control means to adjust the color of the light pulses generated by each flash tube means in response to the flash color commands, and wherein the system status signals displayed on the video display include signals indicative of the flash color of each flash tube means.

8. The system of claim 5 further comprising flash head temperature control means to monitor and control the internal temperature of each flash head.

9. The system of claim 8 wherein the flash intensity control means is responsive to the flash head temperature control means.

10. The system of claim 9 wherein the flash sequence includes a flash rate for each flash tube means and wherein the personal computer includes means to adjust the flash rate for one or more flash heads in response to the flash head temperature control means.

11. The system of claim 10 wherein the flash head temperature control means comprises a fan internal to each flash head.

12. The system of claim 11, the system control unit further comprising at least one flash head interface circuit operatively connected to each flash head and to the processor means.

13. The system of claim 1, wherein the flash heads are mounted in a tri-pack configuration to a flash head mounting plate.

14. A system for directing the movement of fish comprising multiple tri-packs of flash heads and means to control the tri-packs of flash heads, each flash head comprising a waterproof flash head housing, a flash tube mounted inside the flash head housing, and cooling means mounted internal to the flash head housing for cooling the flash head, the flash head being filled with nitrogen gas.

15. The system of claim 14, the flash head cooling means comprising a fan and each flash head further comprising an air plenum means for directing air around the flash tube.

16. The system of claim 15, each flash head further comprising an air passageway between the side wall of the air plenum means and the flash head housing.

17. The system of claim 16, each flash head further comprising a light reflector, the light reflector forming part of the air plenum.

18. The system of claim 17, each flash tube having electrode leads, and the electrode leads including cooling fans extending therefrom.

19. The system of claim 18, the light reflector having a parabolic shape formed around and extending upward from the flash tube.

20. A system for directing the movement of fish proximate to a structure located in a body of water comprising multiple flash heads submerged in the water and arranged in a pattern proximate the structure, control means operatively connected to each flash head to cause the multiple flash heads to produce a sequence of flashes through a flash head lens which are visible to the fish, and a trailer for housing the system and transporting it to and from the structure.

21. The system of claim 20 further comprising submerged water jet means to remove scum from one or more flash head lenses by directing a stream of water at the lens.

22. The system of claim 21 further comprising temperature probe means positioned proximate one or more flash heads to provide a signal to the control means which is responsive to water temperature.

23. The system of claim 22 wherein each of the components of the system is able to be stationed in a trailer for mobile access of the structure by the system.

24. A mobile system for directing the movement of fish proximate to a structure located in a body of water comprising:

a. a mobile housing adapted for storing and transporting the system to and from the structure;

b. a system control unit installed in a first area inside the mobile housing whereby an operator of the system can control the system while seated inside the mobile housing;

c. a flash head interface and control unit installed in a second area of the mobile housing and operatively connected to the system control unit;

d. multiple flash heads adapted for installation beneath the body of water near the structure, and electrically connected to the flash head interface and control unit;

e. whereby when the system is installed proximate the structure, the system control unit and flash head interface and control unit will cause the flash heads to produce a sequence of flashes through a flash head lens which are visible to the fish.

25. The system of claim 24 wherein the flash head interface and control unit comprises multiple flash head interface circuits and multiple timing and trigger boards, each timing and trigger board being located on a motherboard and one or more daughter cards, the motherboard is attached to the mobile housing in the first area, each daughter card electrically and mechanically connected to the motherboard.

26. The system of claim 25 wherein the flash head interface circuit comprises a bank of capacitors which are mounted on a capacitor rack attached to the mobile housing in a third area of the mobile housing.

27. The system of claim 26 wherein the flash head interface circuit comprises a bank of transformers which are mounted on a transformer rack attached to the mobile housing in a fourth area of the mobile housing.

28. The system of claim 27 wherein the electrical connection between the flash heads and the flash head control and interface unit is provided by a flash head termination rack that is attached to the mobile housing in a fifth area of the mobile housing.

29. The system of claim 24 wherein each flash head interface and control unit is operatively connected to three flash heads mounted on a flash head mounting plate in a tri-pack configuration, and the electrical connection between each flash head interface and control unit and each flash head tri-pack comprises a single cable.

30. A method of directing the movement of fish in a body of water near a structure, comprising the steps of:
   a. placing a plurality of flash heads in a pattern beneath the surface of the body of water near the structure;
   b. electrically connecting the flash heads to a system control unit; and
   c. causing the system control unit to generate a series of flash head control signals to the flash heads whereby the flash heads will produce a series of flashes visible to the fish in a predetermined sequence.

31. The method of claim 30, further comprising the step of transporting the flash heads and the system control unit to the structure in a mobile trailer.

32. The method of claim 30, further comprising the step of providing each flash head with an internal atmosphere comprising substantially nitrogen.

33. The method of claim 30, further comprising the step of arranging and operating the flash heads in a tri-pack configuration of three flash heads.

* * * * *